US010225529B2

(12) United States Patent
Okumura

(10) Patent No.: US 10,225,529 B2
(45) Date of Patent: Mar. 5, 2019

(54) PROJECTION DEVICE USING A SPATIAL MODULATION ELEMENT, PROJECTION METHOD, AND PROGRAM STORAGE MEDIUM

(71) Applicant: NEC Corporation, Minato-ku, Tokyo (JP)

(72) Inventor: Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/738,232

(22) PCT Filed: Jul. 15, 2016

(86) PCT No.: PCT/JP2016/003341
§ 371 (c)(1),
(2) Date: Dec. 20, 2017

(87) PCT Pub. No.: WO2017/013862
PCT Pub. Date: Jan. 26, 2017

(65) Prior Publication Data
US 2018/0173083 A1    Jun. 21, 2018

(30) Foreign Application Priority Data
Jul. 17, 2015   (JP) ................................ 2015-142770

(51) Int. Cl.
*H04N 9/31*  (2006.01)
*G03B 21/00*  (2006.01)
(Continued)

(52) U.S. Cl.
CPC ............ *H04N 9/312* (2013.01); *G03B 21/00* (2013.01); *G03B 21/005* (2013.01); *G03B 21/14* (2013.01);
(Continued)

(58) Field of Classification Search
CPC ...... H04N 9/312; H04N 9/3126; H04N 9/315; H04N 9/3152; H04N 9/3155;
(Continued)

(56) References Cited

U.S. PATENT DOCUMENTS

| 6,850,352 B1 * | 2/2005 | Childers | .................. G09G 3/34 359/237 |
| 7,092,137 B2 * | 8/2006 | Childers | .................. G09G 3/34 359/237 |

(Continued)

FOREIGN PATENT DOCUMENTS

| JP | 2005-037682 | 2/2005 |
| JP | 2013-120362 | 6/2013 |

(Continued)

OTHER PUBLICATIONS

International Search Report for PCT Application No. PCT/JP2016/003341, dated Sep. 27, 2016.
(Continued)

*Primary Examiner* — Bao-Luan Q Le

(57) ABSTRACT

A projection device is provided for finally displaying a clear desired target image while shortening time until the target image is displayed, the projection device including: a light source; a spatial modulation element reflecting light from the light source by a display unit displaying a phase distribution of a target image; a modulation element control means that performs, in parallel by different arithmetic units, first processing of generating a phase distribution of the target image and second processing of generating a phase distribution of the target image by processing with a calculation cost higher than the first processing, and displays a phase distribution generated by the second processing on a display surface of the spatial modulation element after displaying a phase distribution generated by the first processing on a display surface of the spatial modulation
(Continued)

element; and a projection means that projects reflected light from the spatial modulation element.

20 Claims, 33 Drawing Sheets

(51) Int. Cl.
G03B 21/14 (2006.01)
G09G 3/20 (2006.01)
H04N 5/74 (2006.01)
G03B 21/20 (2006.01)
G03H 1/22 (2006.01)
G06F 3/01 (2006.01)

(52) U.S. Cl.
CPC ....... G03B 21/2066 (2013.01); G03H 1/2294 (2013.01); G06F 3/01 (2013.01); G09G 3/20 (2013.01); H04N 5/74 (2013.01); H04N 9/315 (2013.01); H04N 9/3126 (2013.01); H04N 9/3152 (2013.01); H04N 9/3155 (2013.01); H04N 9/3158 (2013.01); H04N 9/3161 (2013.01); H04N 9/3164 (2013.01); H04N 9/3179 (2013.01); H04N 9/3182 (2013.01); H04N 9/3194 (2013.01)

(58) Field of Classification Search
CPC .. H04N 9/3158; H04N 9/3161; H04N 9/3164; H04N 9/3179; H04N 9/3182
See application file for complete search history.

(56) References Cited

U.S. PATENT DOCUMENTS

| 7,583,875 | B2* | 9/2009 | Yamauchi | G02B 27/1046 |
| | | | | 359/15 |
| 7,609,746 | B2* | 10/2009 | Yamauchi | G03B 33/12 |
| | | | | 372/102 |
| 7,715,084 | B2* | 5/2010 | Tan | G02B 27/48 |
| | | | | 359/279 |
| 7,856,160 | B2* | 12/2010 | Yamauchi | G02B 27/1046 |
| | | | | 359/15 |
| 7,866,830 | B2* | 1/2011 | Toyooka | H04N 9/3129 |
| | | | | 353/94 |
| 8,064,114 | B2* | 11/2011 | Facius | G02B 5/1828 |
| | | | | 359/15 |
| 8,625,182 | B2* | 1/2014 | Cable | G03H 1/0808 |
| | | | | 359/9 |
| 9,075,184 | B2* | 7/2015 | Popovich | H01L 33/10 |
| 9,134,700 | B2* | 9/2015 | Sugiyama | G02B 27/0103 |
| 9,262,995 | B2* | 2/2016 | Fujioka | G02B 27/1066 |
| 9,335,558 | B2* | 5/2016 | Yasui | G02B 27/48 |
| 9,778,477 | B2* | 10/2017 | Aksyuk | G02B 26/06 |
| 10,078,258 | B2* | 9/2018 | Okumura | H04N 9/3155 |
| 2005/0162725 | A1* | 7/2005 | Childers | G09G 3/34 |
| | | | | 359/237 |
| 2007/0019909 | A1* | 1/2007 | Yamauchi | G02B 27/1046 |
| | | | | 385/37 |
| 2008/0088914 | A1* | 4/2008 | Toyooka | H04N 9/3129 |
| | | | | 359/315 |
| 2008/0187012 | A1* | 8/2008 | Yamauchi | G03B 33/12 |
| | | | | 372/26 |
| 2008/0212040 | A1* | 9/2008 | Aksyuk | G02B 26/06 |
| | | | | 353/99 |
| 2008/0247016 | A1* | 10/2008 | Facius | G02B 5/1828 |
| | | | | 359/15 |
| 2009/0257106 | A1* | 10/2009 | Tan | G02B 27/48 |
| | | | | 359/279 |
| 2009/0297100 | A1* | 12/2009 | Yamauchi | G02B 27/1046 |
| | | | | 385/37 |
| 2010/0177253 | A1* | 7/2010 | Golub | G02B 27/0927 |
| | | | | 349/8 |
| 2010/0277566 | A1* | 11/2010 | Cable | G03H 1/02 |
| | | | | 348/40 |
| 2011/0002019 | A1* | 1/2011 | Routley | G02B 27/48 |
| | | | | 359/9 |
| 2011/0109948 | A1* | 5/2011 | Cable | G03H 1/0808 |
| | | | | 359/9 |
| 2013/0016136 | A1* | 1/2013 | Yasui | G02B 27/48 |
| | | | | 345/690 |
| 2013/0106847 | A1* | 5/2013 | Sugiyama | G03H 1/2294 |
| | | | | 345/419 |
| 2013/0271731 | A1* | 10/2013 | Popovich | H01L 33/10 |
| | | | | 353/31 |
| 2014/0043352 | A1* | 2/2014 | Damberg | H04N 9/3147 |
| | | | | 345/589 |
| 2014/0240378 | A1* | 8/2014 | Fujioka | G02B 27/1066 |
| | | | | 345/690 |
| 2015/0124225 | A1* | 5/2015 | Akiyama | G02B 19/0057 |
| | | | | 353/31 |
| 2016/0004219 | A1* | 1/2016 | Leister | G02B 5/32 |
| | | | | 359/9 |
| 2016/0011493 | A1 | 1/2016 | Okumura | |
| 2016/0205363 | A1* | 7/2016 | Okumura | H04N 9/3155 |
| | | | | 348/177 |
| 2016/0238833 | A1 | 8/2016 | Okumura | |
| 2016/0295178 | A1* | 10/2016 | Damberg | G03H 1/2294 |
| 2017/0127025 | A1* | 5/2017 | Damberg | H04N 9/312 |

FOREIGN PATENT DOCUMENTS

| JP | 2014-206710 | 10/2014 |
| WO | 2014/136292 A1 | 9/2014 |
| WO | 2015/022897 A1 | 2/2015 |
| WO | 2015/049866 A1 | 4/2015 |

OTHER PUBLICATIONS

English translation of Written opinion for PCT Application No. PCT/JP2016/003341.

* cited by examiner

PROJECTION DEVICE USING A SPATIAL MODULATION ELEMENT, PROJECTION METHOD, AND PROGRAM STORAGE MEDIUM

This application is a National Stage Entry of PCT/JP2016/003341 filed on Jul. 15, 2016, which claims priority from Japanese Patent Application 2015-142770 filed on Jul. 17, 2015, the contents of all of which are incorporated herein by reference, in their entirety.

TECHNICAL FIELD

The present invention relates to a projection device using a spatial modulation element, a projection method, and a projection program.

BACKGROUND ART

Development of an interface device combining a projector with a camera has been under way in recent years. Such an interface device provides an interactive operation by recognizing a manipulation content on image data captured by a camera, the manipulation being performed on an image projected from a projector. Each of PTLs 1 and 2 discloses an interface device combining a projector with a camera.

The interface device in PTL 2 includes an irradiation means using a phase modulation type spatial modulation element. A projector using a phase modulation type spatial modulation element is able to display a desired target image on a projection surface by displaying a phase distribution for projecting the target image on a display surface of the spatial modulation element and projecting reflected light of light irradiated on the display surface. The interface device in PTL 2 forms a phase distribution displayed on the spatial modulation element one by one, by using an optimization method such as an iterative Fourier transform method. The iterative Fourier transform method iterates processing any number of times until an operation result converges, resulting in a high calculation cost. Accordingly, when a high-quality target image is displayed in real time, an amount of calculation may become enormous, causing a delay in the processing.

PTL 3 discloses a method for shortening a calculation time, when a computer generated hologram by using an optimization method such as the iterative Fourier transform method.

At first, the method in PTL 3 generates a sub-target reconstructed image including part of pixels of a target reconstructed image and generates a computer-generated hologram for reconstructing the sub-target reconstructed image. Next, the method in PTL 3 generates a new sub-target reconstructed image with increased resolution, being obtained by adding pixels to the already-generated sub-target reconstructed image. Then, the method generates a computer generated hologram for generating the new sub-target reconstructed image. The method in PTL 3 repeats generation of a new sub-target reconstructed image and generation of a computer-generated hologram for generating the sub-target reconstructed image until the computer-generated hologram reaches a target number of pixels.

CITATION LIST

Patent Literature

[PTL 1] International Application Publication No. WO 2014/136292

[PTL 2] International Application Publication No. WO 2015/049866

[PTL 3] Japanese Unexamined Patent Application Publication No. 2005-37682

SUMMARY OF INVENTION

Technical Problem

The method in PTL 3 enables to shorten time required for generating a computer generated hologram. However, while the method in PTL 3 enables to shorten the time required for generating a computer generated hologram, a target reconstructed image formed by using a computer generated hologram cannot be projected during generation of the computer generated hologram. Accordingly, the method in PTL 3 has a problem that, in a situation that a state of a target reconstructed image changes during generation of a computer-generated hologram, a state of a displayed reconstructed image deviates from a real-time state. Further, the method in PTL 3 has a problem that, even when a projected reconstructed image is unclear, a clear reconstructed image cannot be obtained without recalculation.

An object of the present invention is to provide a projection device capable of finally displaying a clear desired target image while shortening time until the target image is displayed.

Solution to Problem

A projection device according to the present invention includes: a light source; a spatial modulation element reflecting light from the light source by a display unit that displays a phase distribution of a target image; a modulation element control unit that performs, in parallel by different arithmetic units, first processing of generating a phase distribution of the target image and second processing of generating a phase distribution of the target image by processing with a calculation cost higher than that of the first processing and causes a phase distribution generated by the second processing to be displayed on a display surface of the spatial modulation element after causing a phase distribution generated by the first processing to be displayed on a display surface of the spatial modulation element; and a projection unit that projects reflected light from the spatial modulation element.

A projection method according to the present invention is a projection method for projecting reflected light of light irradiated on a display surface of a spatial modulation element, the projection method including: performing, in parallel by different arithmetic units, first processing of generating a phase distribution of a target image and second processing of generating a phase distribution of the target image by processing with a calculation cost higher than that of the first processing; and displaying a phase distribution generated by the second processing on a display surface of the spatial modulation element after displaying a phase distribution generated by the first processing on a display surface of the spatial modulation element.

A projection program according to the present invention is a projection program for projecting reflected light of light irradiated on a display surface of a spatial modulation element, the projection program causing a computer to perform: processing of performing, in parallel by different arithmetic units, first processing of generating a phase distribution of a target image and second processing of generating a phase distribution of the target image by processing with a calculation cost higher than that of the first processing; and processing of displaying a phase distribution generated by the second processing on a display surface of the spatial modulation element after displaying a phase distribution generated by the first processing on a display surface of the spatial modulation element.

Advantageous Effects of Invention

The present invention enables to provide a projection device capable of finally displaying a clear desired target image while shortening time until the target image is displayed.

DESCRIPTION OF EMBODIMENTS

Example embodiments of the present invention will be described below using drawings. However, while a technically preferable limitation for implementing the present invention is imposed on the example embodiments described below, the limitation does not limit the scope of the invention to the following. Note that, in all diagrams used for description of the following example embodiments, a same reference sign is given to similar parts unless there is a specific reason. Further, repeated description of a similar configuration or operation may be omitted in the following example embodiments.

(First Example Embodiment)
(Configuration)

First, a configuration of a projection device 10 according to a first example embodiment of the present invention will be described referring to drawings.

Figure 1:
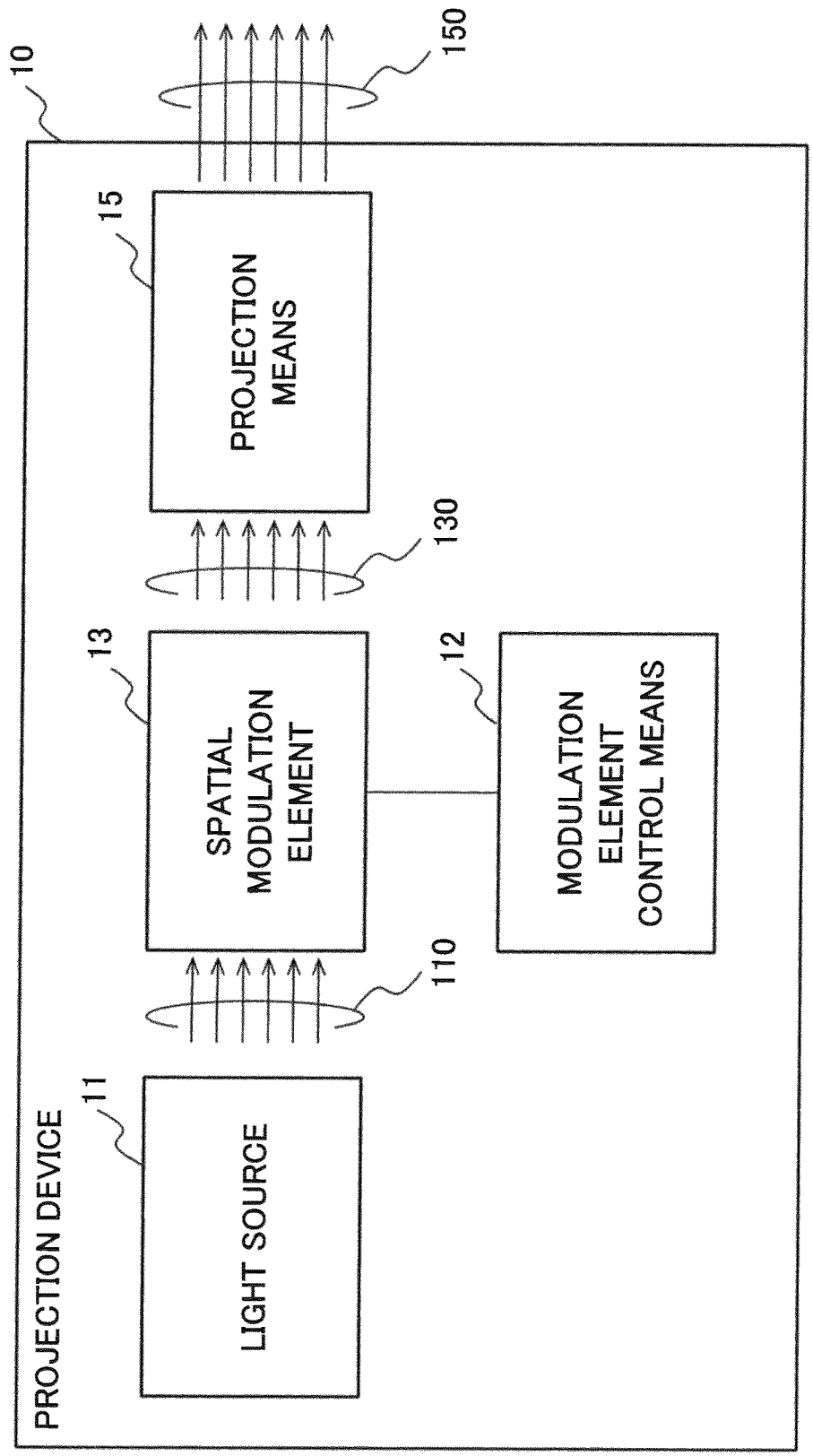
FIG. 1 is a block diagram illustrating a configuration of a projection device according to a first example embodiment of the present invention.

FIG. 1 is a block diagram illustrating a configuration of the projection device 10 according to the present example embodiment. As illustrated in FIG. 1, the projection device 10 according to the present example embodiment includes a light source 11, a modulation element control means 12, a spatial modulation element 13, and a projection means 15.

The light source 11 emits light at a specific wavelength. The coherent light 110 emitted by the light source 11 is launched into a display surface of the spatial modulation element 13. The light source 11 may be configured to emit light in the visible region or may be configured to emit light in an invisible region such as the ultraviolet region or the infrared region.

The modulation element control means 12 acquires information (hereinafter referred to as target image information) about a projected image (hereinafter referred to as a target image) and controls the spatial modulation element 13, based on the acquired target image information. For example, the modulation element control means 12 inputs target image information from a higher level system such as a server. Furthermore, the modulation element control means 12 may acquire target image information set based on a manipulation content input from a user interface (unillustrated).

Figure 2:
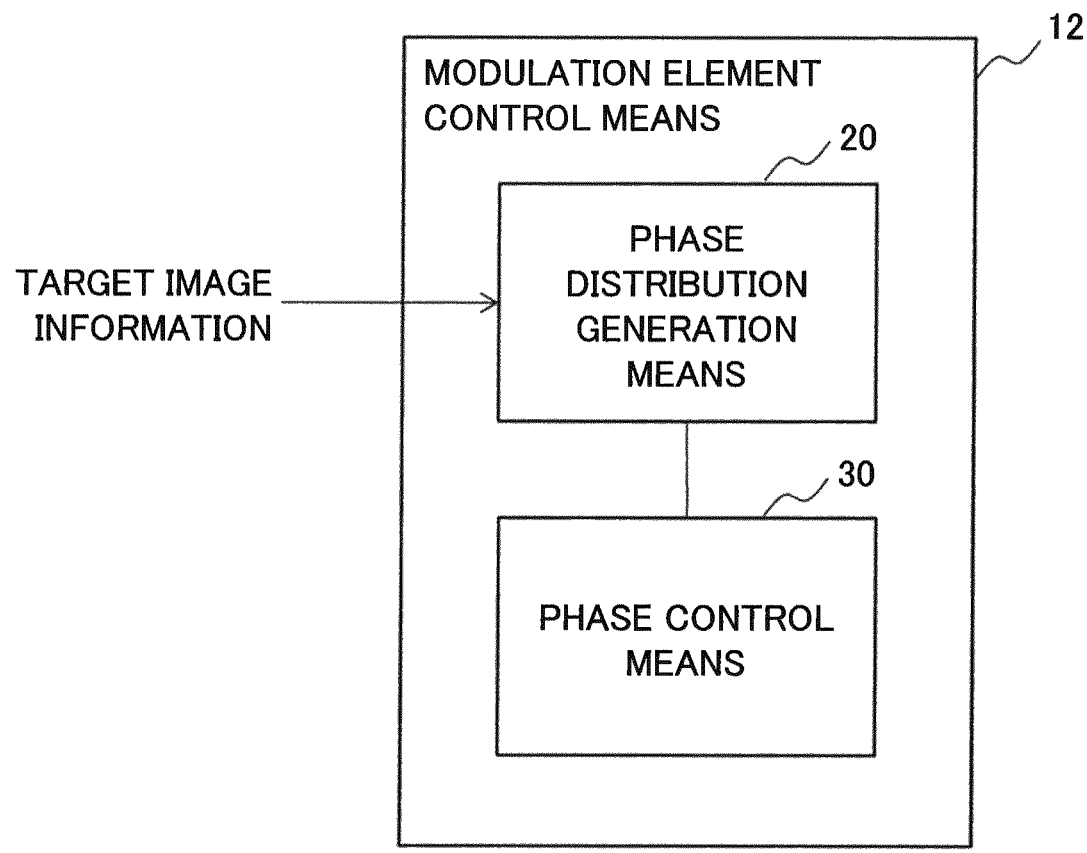
FIG. 2 is a block diagram illustrating a configuration of a modulation element control means in the projection device according to the first example embodiment of the present invention.

Using FIG. 2, a configuration of the modulation element control means 12 will be described here. The modulation element control means 12 includes a phase distribution generation means 20 and a phase control means 30.

The phase distribution generation means 20 generates a phase distribution for displaying a light intensity distribution corresponding to a target image on a projection surface (hereinafter referred to as a phase distribution of a target image), based on input target image information.

The phase control means 30 controls the spatial modulation element 13 in such a way that a parameter deciding a difference between a phase of the light 110 irradiated on the display surface of the spatial modulation element 13 and a phase of modulated light 130 reflected on the display surface is changed. For example, the modulation element control means 12 changes a refractive index of the display surface of the spatial modulation element 13 by controlling voltage applied to the spatial modulation element 13.

When causing different phase distributions to be simultaneously displayed on the display surface of the spatial modulation element 13, the phase control means 30 divides the display surface into a plurality of display areas and causes the different phase distributions to be displayed on the display areas in a distributed manner. When dividing the display surface into a plurality of display areas, it is preferable that the phase control means 30 include a storage unit storing a phase distribution displayed on each display area.

The spatial modulation element 13 displays a phase distribution of a desired target image on the local display surface, in accordance with control by the modulation element control unit 12. For example, the spatial modulation element 13 may be provided by a phase modulation type spatial modulation element that receives incident light 110 being phase-aligned and coherent, and modulates a phase of the incident light 110.

The spatial modulation element 13 emits toward the projection means 15 the modulated light 130 being modulated. Furthermore, the spatial modulation element 13 may be a type of element different from the phase modulation type as long as a desired target image can be projected on the projection surface.

A phase distribution of a desired target image projected on the projection surface is displayed on the display surface of the phase modulation type spatial modulation element 13. The modulated light 130 reflected on the display surface of the spatial modulation element 13 becomes an image of a kind of diffraction gratings forming an aggregate, and the desired target image is formed by convergence of light diffracted by the diffraction gratings.

For example, the spatial modulation element 13 is provided by a spatial modulation element using a ferroelectric liquid crystal, a homogeneous liquid crystal, a homeotropic liquid crystal, or the like. Specifically, the spatial modulation element 13 may be provided by a liquid crystal on silicon (LCOS). Further, for example, the spatial modulation element 13 may be provided by a micro-electromechanical system (MEMS).

The projection means 15 converts the modulated light 130 from the display surface of the spatial modulation element 13 into signal light 150 and projects the signal light 150 on the projection surface.

Figure 3:
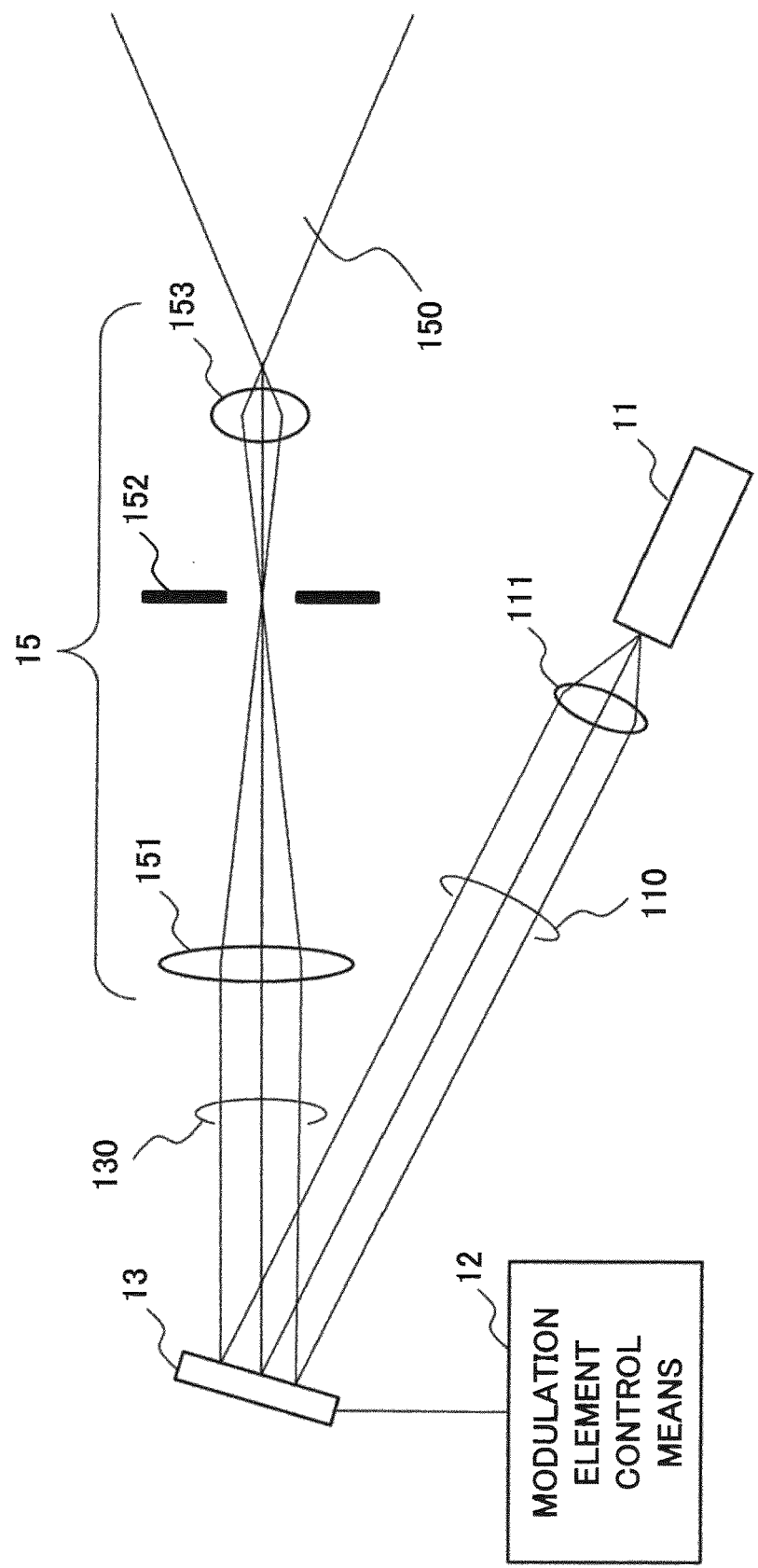
FIG. 3 is a conceptual diagram illustrating an optical configuration of the projection device according to the first example embodiment of the present invention.

FIG. 3 is a conceptual diagram illustrating an optical configuration of the projection device 10 according to the present example embodiment. As illustrated in FIG. 3, the projection device 10 includes a collimator 111, a Fourier transform lens 151, an aperture 152, and a projection lens 153 in addition to the configuration in FIG. 1. The Fourier transform lens 151, the aperture 152, and the projection lens 153 in FIG. 3 are components of the projection means 15.

The collimator 111 is a lens converting the coherent light emitted by the light into the light 110.

The Fourier transform lens 151 is an optical lens for forming an image formed when the modulated light 130 reflected on the display surface of the spatial modulation element 15 is projected to infinity at a focal position. The Fourier transform lens 151 may be composed of a single lens or may be composed of a combination of a plurality of lenses.

The aperture 152 has a function of eliminating higher order light included in light converged by the Fourier transform lens 151 and specifying an image area. An opening on the aperture 152 is formed smaller than the image area of display information at a position of the aperture 152 and is installed in such a way to block an area around a target image formed at the position of the aperture 152. For example, a rectangular or circular opening is formed on the aperture 152. While it is preferable that the aperture 152 be installed at a focal position of the Fourier transform lens 151, the installed position may deviate from the focal position as long as the function of eliminating higher order light can be exhibited.

The projection lens 153 is an optical lens magnifying and projecting light converged by the Fourier transform lens 151. The projection lens 153 projects the signal light 150 in such a way that a target image related to a phase distribution input to the spatial modulation element 15 is displayed on the projection surface. Furthermore, when the target image can be projected on the projection surface without the projection lens 153, the projection lens 153 may be omitted.

The signal light 150 projected from the projection means 15 is not uniformly projected on the entire projection surface but instead is intensively projected on image parts constituting a target image, such as a character, a symbol, and a frame. In this case, an amount of irradiation of the light 110 can be practically decreased, and therefore a total optical output of the projection device 10 can be held down. Accordingly, the light source part in the projection device 10 according to the present example embodiment can be configured with a small-sized and low-power light source 11 and a low-powered power source driving the light source 11.

As illustrated in FIG. 3, the present example embodiment makes an incidence angle of the light 110 non-perpendicular to the display surface of the spatial modulation element 13. Specifically, the present example embodiment makes an emission axis of the light emitted from the light source 11 diagonal to the display surface of the spatial modulation element 13. By setting the emission axis of the light 110 diagonal to the display surface of the spatial modulation element 13, the light 110 can be launched into the spatial modulation element 13 without using a beam splitter, and therefore efficiency can be improved.

(Phase Distribution Generation Means)

Figure 4:
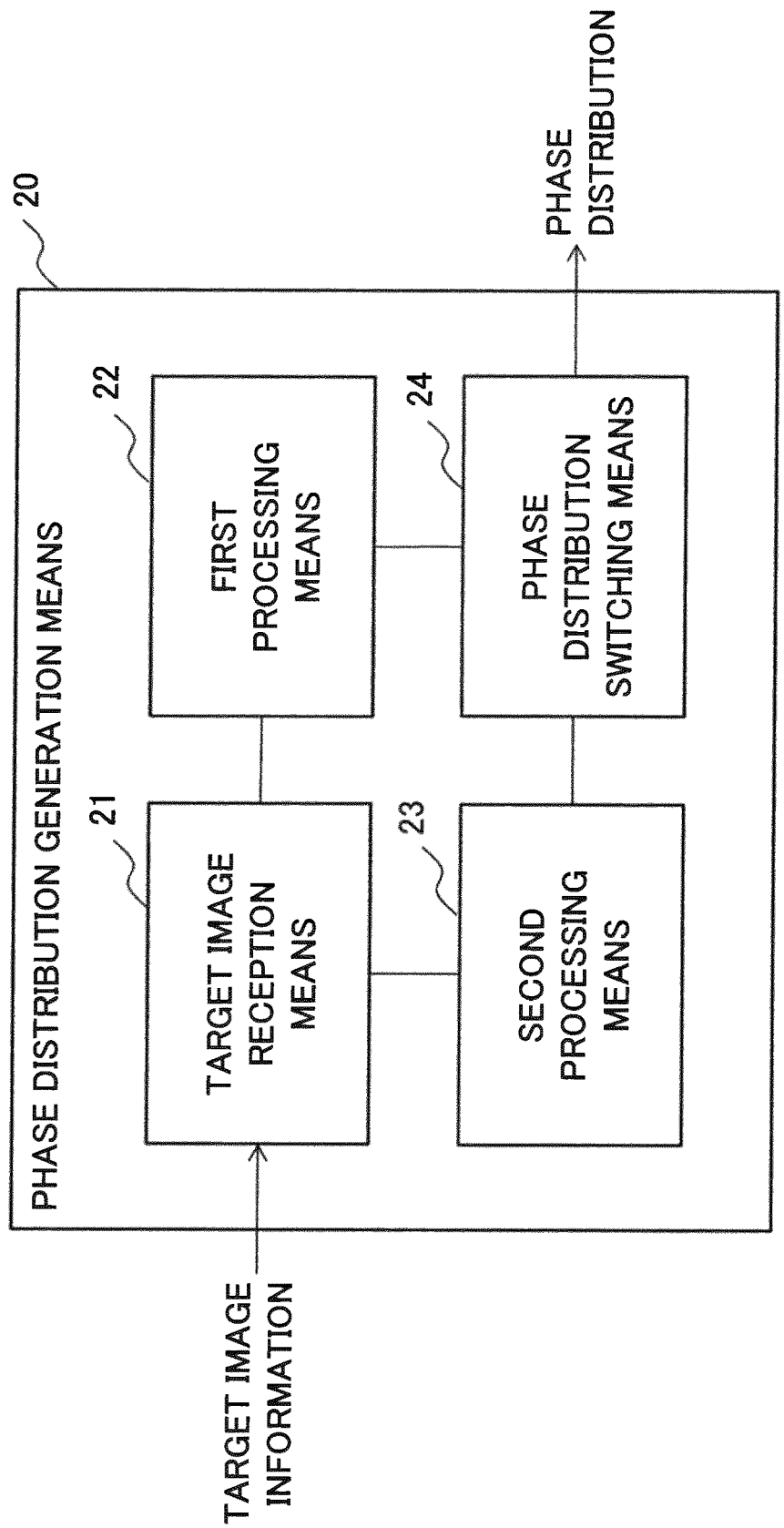
FIG. 4 is a block diagram illustrating a configuration of a phase distribution generation means in the projection device according to the first example embodiment of the present invention.

Details of the phase distribution generation means 20 will be described here using drawings. FIG. 4 is a detailed configuration of the phase distribution generation means 20.

As illustrated in FIG. 4, the phase distribution generation means 20 includes a target image reception means 21, a first processing means 22, a second processing means 23, and a phase distribution switching means 24.

The target image reception means 21 is a reception unit acquiring a target image from a higher level system. The target image reception means 21 outputs the acquired target image to the first processing means 22 and the second processing means 23. Furthermore, the target image reception means 21 may have a transmission function of transmitting data to the higher level system.

The first processing means 22 performs first processing on a target image acquired from the target image reception means 21 and generates a phase distribution of a primary indication (also referred to as a first phase distribution). The first processing is processing with a lower calculation cost compared with second processing performed by the second processing means 23. Accordingly, the first processing completes in a shorter period of time compared with the second processing. Furthermore, the primary indication is display processing performed first on the target image input to the phase distribution generation means 20. The first processing means 22 outputs the phase distribution of the primary indication generated by the first processing to the phase distribution switching means 24.

The second processing means 23 performs the second processing on a target image acquired from the target image reception means 21 and generates a phase distribution of a secondary indication (also referred to as a second phase distribution). The second processing is processing with a higher calculation cost compared with the first processing performed by the first processing means 22. Accordingly, the second processing is processing taking more time compared with the first processing. Furthermore, the secondary indication is display processing performed subsequently to the primary indication performed on a target image input to the phase distribution generation means 20. The secondary indication may be performed only once subsequently to the primary indication or may be progressively performed over several times. The second processing means 23 outputs the phase distribution of the secondary indication generated by the second processing to the phase distribution switching means 24.

As described above, the first processing means 22 performs the first processing with a calculation cost lower than that of the second processing performed by the second processing means 23.

The first processing means 22 performing first processing with a lower calculation cost, such as selecting and compositing previously stored basic images, and the second processing means 23 performing second processing with a higher calculation cost of 1000 iterations of iterative Fourier transform processing can be taken as an example. Further, the first processing means 22 performing first processing of ten iterations of iterative Fourier transform and the second processing means 22 performing second processing of 1000 iterations of iterative Fourier transform processing can be taken as another example.

The phase distribution switching means 24 acquires a phase distribution of a primary indication output by the first processing means 22 and a phase distribution of a secondary indication output by the second processing means 23.

When acquiring a phase distribution of a primary indication, the phase distribution switching means 24 outputs the phase distribution of the primary indication to the phase control means 30. When acquiring a phase distribution of a secondary indication, the phase distribution switching means 24 outputs the phase distribution of the secondary indication to the phase control means 30 in place of the phase distribution of the primary indication, based on a decision criterion to be described later. Furthermore, when phase distributions of a secondary indication are progressively input, the phase distribution switching means 24 outputs a phase distribution of the secondary indication at every input of the phase distribution.

The above describes the configuration of the projection device 10 according to the present example embodiment.

(Operation)

Next, an operation of the projection device 10 according to the present example embodiment will be described.

First, using a flowchart in FIG. 5, an operation performed by the phase distribution generation means 20 will be described. Note that, while each component of the phase distribution generation means 20 is described as an operating entity in FIG. 5, description of input-output processing between some of the components is omitted.

First, the target image reception means 21 acquires a target image from a higher level system (Step S11). For example, the higher level system may be configured on a server or the like connected to the projection device 10 through a network such as the Internet. The target image reception means 21 outputs the acquired target image to the first processing means 22 and the second processing means 23.

Figure 5:
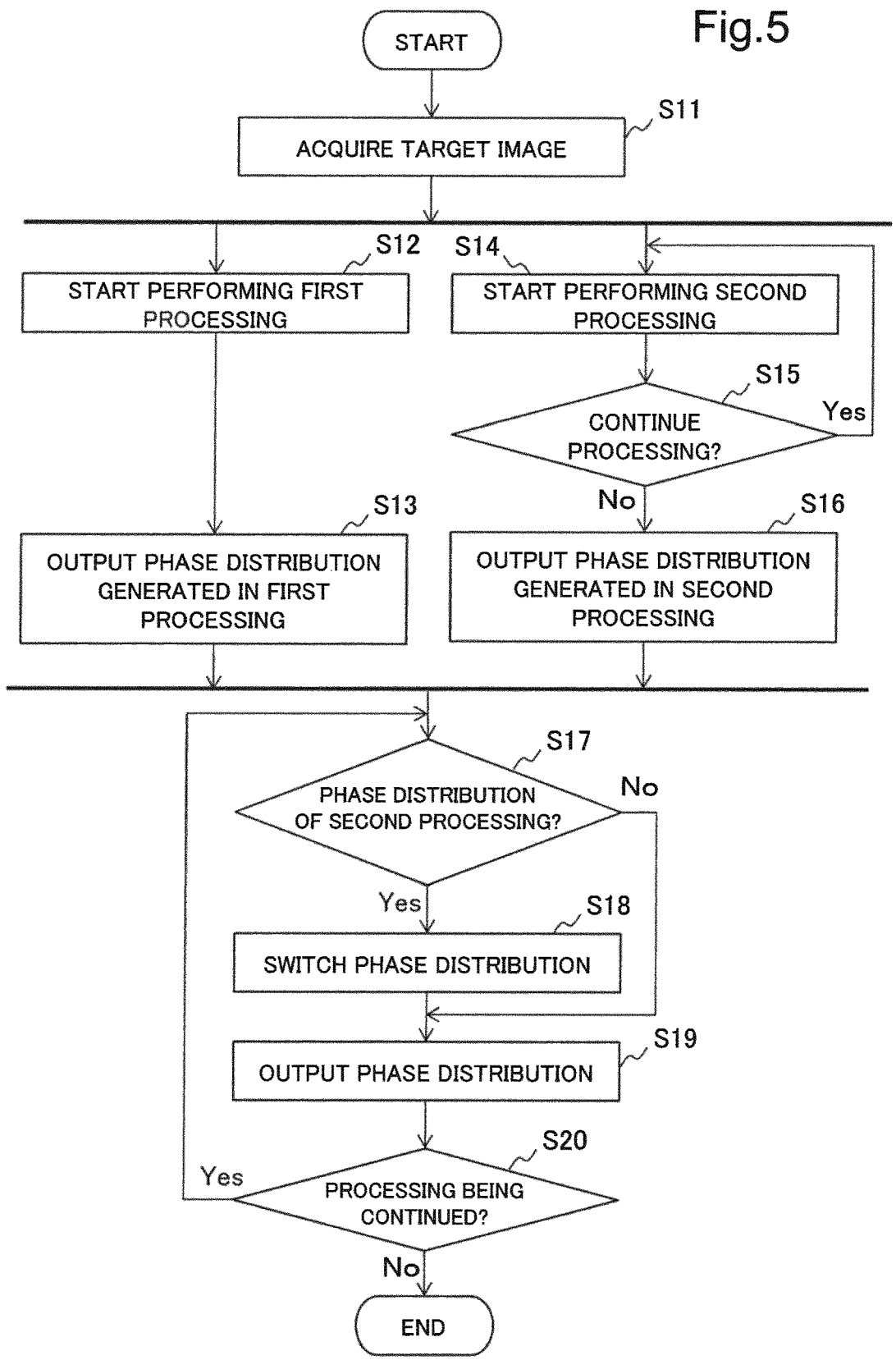
FIG. 5 is a flowchart illustrating an operation example of the phase distribution generation means in the projection device according to the first example embodiment of the present invention.

In FIG. 5, first processing in Steps S12 and S13, and second processing in Steps S14 to S16 are performed in parallel. It is preferable that the first processing and the second processing be performed separately by different processors. Further, when the second processing includes a plurality of sets of processing, the sets of processing may be continuously performed by a single processor or may be performed in parallel by a plurality of processors in a distributed manner.

First, the first processing means 22 performs the first processing on the acquired phase distribution (Step S12).

Then, the first processing means 22 outputs the phase distribution generated in the first processing to the phase distribution switching means 24 (Step S13).

Secondly, the second processing means 23 performs the second processing on the acquired phase distribution (Step S14).

When the second processing is to be continued (Yes in Step S15), the second processing means 23 returns to Step S14. On the other hand, when the second processing is to be ended (No in Step S15), the second processing means 23 proceeds to Step S16. Furthermore, for example, the second processing in Step S15 may decide whether or not to continue, based on a decision criterion to be described later.

Then, the second processing means 23 outputs the phase distribution generated in the second processing to the phase distribution switching means 24 (Step S16). Furthermore, when the second processing is sequentially performed several times, the second processing means 23 may return to Step S14 after Step S16.

The phase distribution switching means 24 acquires the phase distribution output in either Step S13 or Step S16.

When the acquired phase distribution is generated in the first processing and is not generated in the second processing (No in Step S17), the phase distribution switching means 24 outputs the phase distribution to the phase control means 30 as is (Step S18).

On the other hand, when the acquired phase distribution is generated in the second processing (Yes in Step S17), the phase distribution switching means 24 switches the already-output phase distribution to the newly-acquired phase distribution, based on a predetermined decision criterion (Step S18).

The phase distribution switching means 24 outputs the switched phase distribution to the phase control means 30 (Step S19).

When the processing related to the target image is being continued (Yes in Step S20), the phase distribution switching means 24 returns to Step S17 and stands by. On the other hand, when every set of processing related to the target image is ended (No in Step S20), the processing based on FIG. 5 is ended.

The phase control means 30 may switch a phase distribution displayed on the display surface of the spatial modulation element 13, based on the phase distribution acquired from the phase distribution generation means 20.

The above describes the operation of the projection device 10 according to the present example embodiment.

As described above, after performing the primary indication generated by the first processing with a lower calculation cost, the present example embodiment switches to the secondary indication generated by the second processing with a higher calculation cost, based on the predetermined decision criterion.

When switching a target image at a high speed as is a case with a dynamic image, a display time of each target image is short, and therefore a modest level of noise is not recognized. As a matter of course, when a display time of a target image is long as is a case with a static image, a same target image is displayed for a longer time, and therefore noise in each target image is more likely to be recognized. Accordingly, by performing processing with a higher calculation cost while displaying a primary indication of a phase distribution generated by first processing with a lower calculation cost and switching the primary indication to a secondary indication generated by the processing with a higher calculation cost, a clean target image can be finally displayed.

The present example embodiment is able to provide a projection device capable of shortening a time between a start of calculation of a phase distribution displayed on the spatial modulation element and display of a desired target image by using the phase distribution, and finally projecting the target image with low noise.

(Second Example Embodiment)

Next, a projection device according to a second example embodiment of the present invention will be described referring to drawings. The projection device according to the present example embodiment performs processing of selecting and compositing basic images as first processing and performs iterative Fourier transform processing as second processing.

Target image information used by the present example embodiment includes information about a basic image constituting a target image. For example, the basic image is an image including at least one pattern being basic (hereinafter referred to as a basic pattern) such as a circle such as "○," a polygon such as "▲" or "□," a mark such as "♣" or "*," a character such as "A" or "B," a frame, or a line. The basic pattern is not limited to the patterns listed above and may use any pattern.

Figure 6:
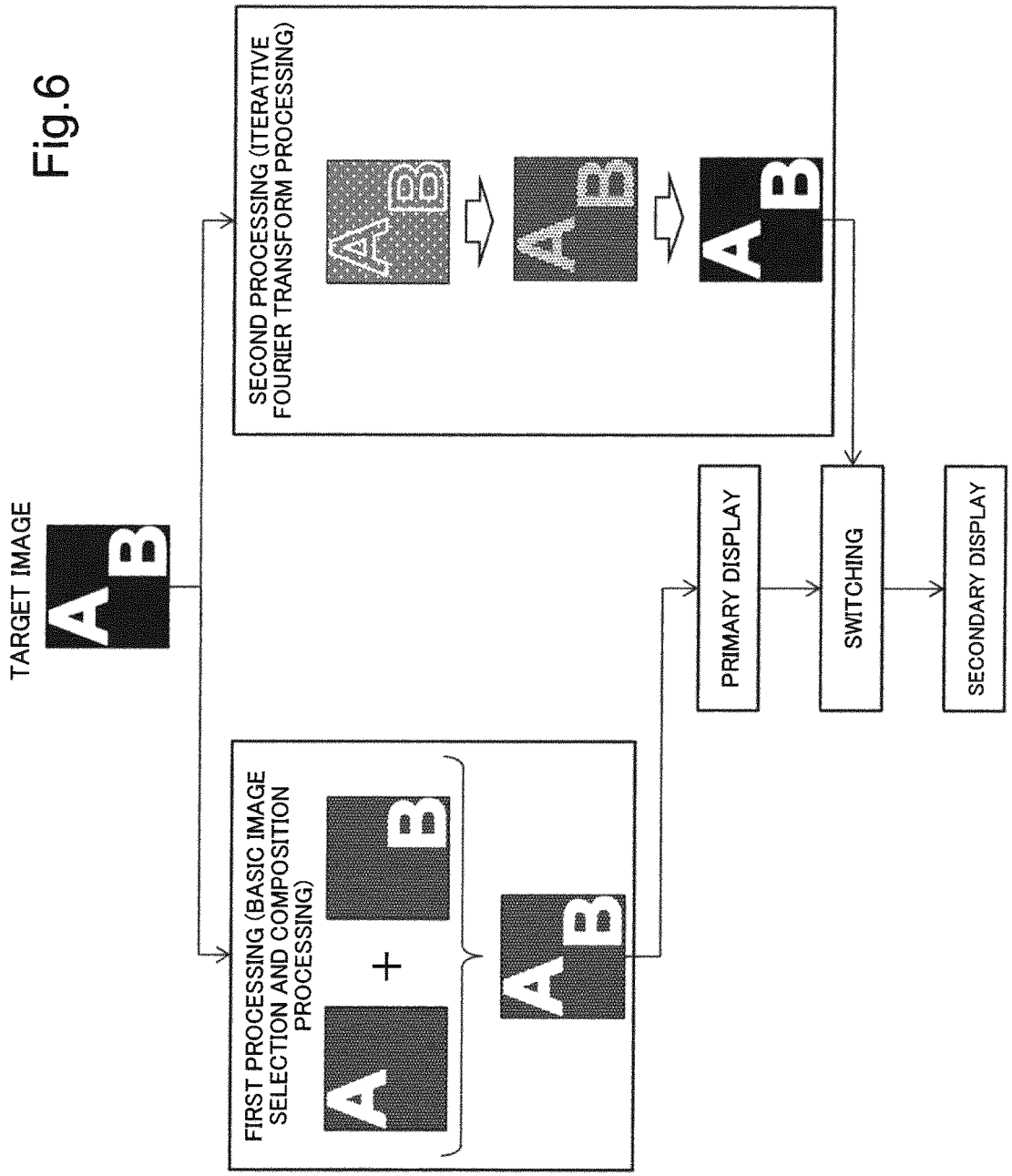
FIG. 6 is a conceptual diagram for illustrating switching of a phase distribution displayed on a display surface of a spatial modulation element in a projection device according to a second example embodiment of the present invention.
Figure 7:
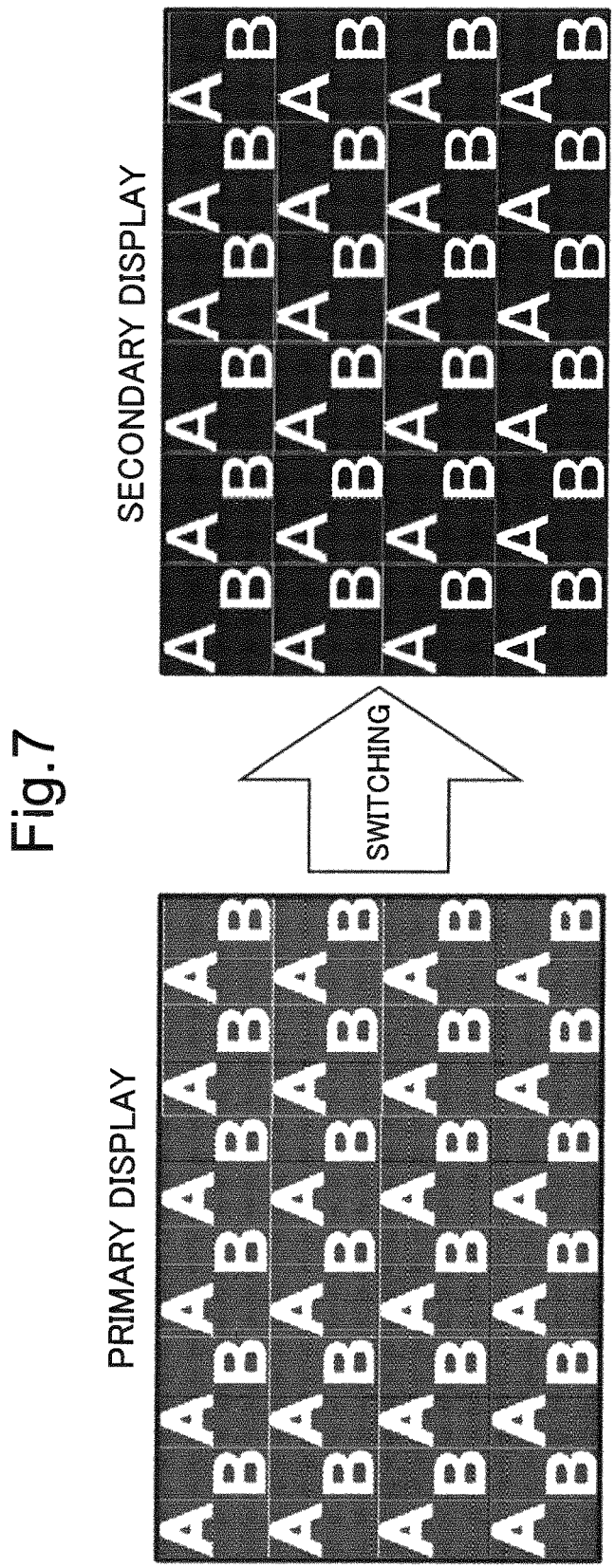
FIG. 7 is a conceptual diagram illustrating an example of switching of a phase distribution displayed on the display surface of the spatial modulation element in the projection device according to the second example embodiment of the present invention.

FIG. 6 is a conceptual diagram for illustrating processing performed by the projection device according to the present example embodiment. Further, FIG. 7 is an example of displaying a phase distribution generated by the processing in FIG. 6 on a display surface of a spatial modulation element 13. Note that, while a phase distribution is displayed on the display surface of the spatial modulation element 13 in practice, an image displayed on a projection surface by using a phase distribution displayed on the display surface of the spatial modulation element 13 is illustrated in examples in FIG. 7 and beyond, in order to facilitate description.

A first processing means 22-2 (to be described later) according to the present example embodiment performs processing of selecting and compositing phase distributions of basic images, as first processing. Further, a second processing means 23-2 (to be described later) performs iterative Fourier transform processing using a target image, as second processing.

First, the projection device according to the present example embodiment displays a phase distribution generated by the first processing means 22-2 on the display surface of the spatial modulation element 13 as a primary indication.

As illustrated in FIG. 6, the first processing means 22-2 extracts basic patterns from the acquired target image and selects phase distributions of basic images including the basic patterns. The first processing means 22-2 previously stores a phase distribution of a basic image including each basic pattern. The first processing means 22-2 generates a phase distribution of the target image by compositing the phase distributions of the basic images including the basic patterns constituting the target image.

The left-hand part of FIG. 7 is an example of a primary indication. In the example in FIG. 7, the display surface of the spatial modulation element 13 is divided into a plurality of display areas composed of four rows and six columns, and a composite basic image including basic patterns A and B is displayed on each display area. A phase control means 30 controls the spatial modulation element 13 to display phase distributions selected and composited by the first processing means 22-2 on each display area as a primary indication.

Subsequently, the projection device according to the present example embodiment displays a phase distribution generated by the second processing means 23-2 on the display surface of the spatial modulation element 13.

As illustrated in FIG. 6, by using the acquired target image, the second processing means 23-2 generates a phase distribution of the target image. FIG. 6 illustrates a state of an image becoming clearer as a number of iterations of iterative Fourier transform processing increases. The second processing means 23-2 outputs a phase distribution generated by a predetermined number of iterations of iterative Fourier transform processing to the phase distribution switching means 24. Furthermore, the second processing means 23-2 may successively output phase distributions generated at intermediate stages in the predetermined number of iterations of iterative Fourier transform processing.

The phase distribution switching means 24 switches the phase distribution used in the primary indication to the phase distribution generated by the second processing means 2-23, based on a decision criterion.

The right-hand part of FIG. 7 is an example of a secondary indication. The phase control means 30 controls the spatial modulation element 30 to display the phase distribution switched by the phase distribution switching means 24 on each display area as a secondary indication.

(Decision Criterion)

Figure 8:
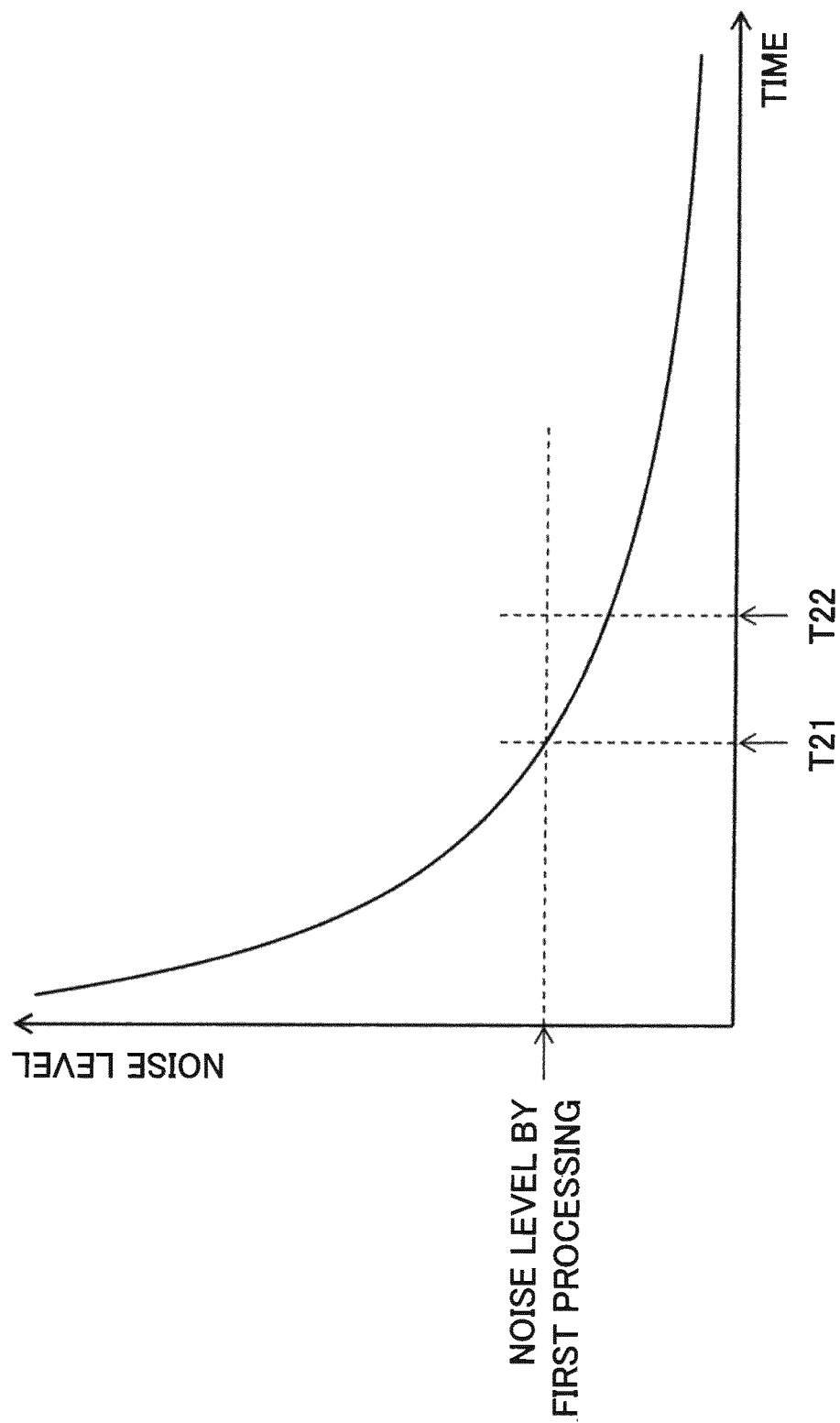
FIG. 8 is a conceptual diagram for illustrating a decision criterion when switching a phase distribution, according to the second example embodiment of the present invention.

Next, a decision criterion for the phase distribution switching means 24 to switch from a phase distribution generated in first processing to a phase distribution generated in second processing will be described. FIG. 8 is a graph for illustrating an example of the decision criterion. Note that it is assumed in the description of the example in FIG. 8 that specific processing is iterated in the second processing.

In the graph in FIG. 8, the horizontal axis represents duration of the specific processing in the second processing, and the vertical axis represents a noise level when a target image is displayed by using a phase distribution generated by the second processing (hereinafter referred to as a noise level of the second processing). Further, in the graph in FIG. 8, a noise level of the target image generated by using a phase distribution generated by the first processing (hereinafter referred to as a noise level of the first processing) is illustrated in a broken line. Furthermore, while the noise level is set to the vertical axis in the example in FIG. 8, another indicator may be set to the vertical axis.

In FIG. 8, a time T21 denotes a point at which a noise level of the second processing becomes equal to the noise level of the first processing. In other words, the time T21 is a criterial time at which a primary indication may be switched to a secondary indication.

Meanwhile, even when the primary indication is switched to the secondary indication at a time point of reaching the time T21, improvement in a noise level of the target image is not likely to be recognized. Accordingly, in practice, the primary indication may be switched to the secondary indication at a time T22 when a noise level of the second processing becomes far below the noise level of the first processing. Furthermore, in order to intentionally make a noise level of the displayed target image less recognizable, the switching from the primary indication to the secondary indication may be set at a time close to the time T21.

For example, the time T22 may be set at a time when a second noise level becomes less than the first noise level by a predetermined noise level. The decision criterion of the noise level may be set by an absolute value, a ratio, or the like of the noise level. Furthermore, when the secondary indication is switched a plurality of number of times, the time T22 may be set in a split manner at a plurality of times corresponding to a switching count of the secondary indication.

A target image projected by using a phase distribution obtained by combining and compositing basic images may generate a target image causing a feeling of strangeness due to differences in contrast and resolution between the respective basic images. On the other hand, a target image generated by iterative Fourier transform processing is clear because there is no difference in contrast and resolution of each basic pattern. However, the iterative Fourier transform processing is processing with a higher calculation cost, and therefore may not be able to display information in a timely manner at a timing when the target image is to be displayed.

The present example embodiment displays a target image generated by first processing with a lower calculation cost as a primary indication and subsequently switches to and displays a target image generated by second processing with a higher calculation cost as a secondary indication. Consequently, the present example embodiment is able to display a clearer desired target image while shortening a time until the target image is displayed.

(First Processing Means)

Figure 9:
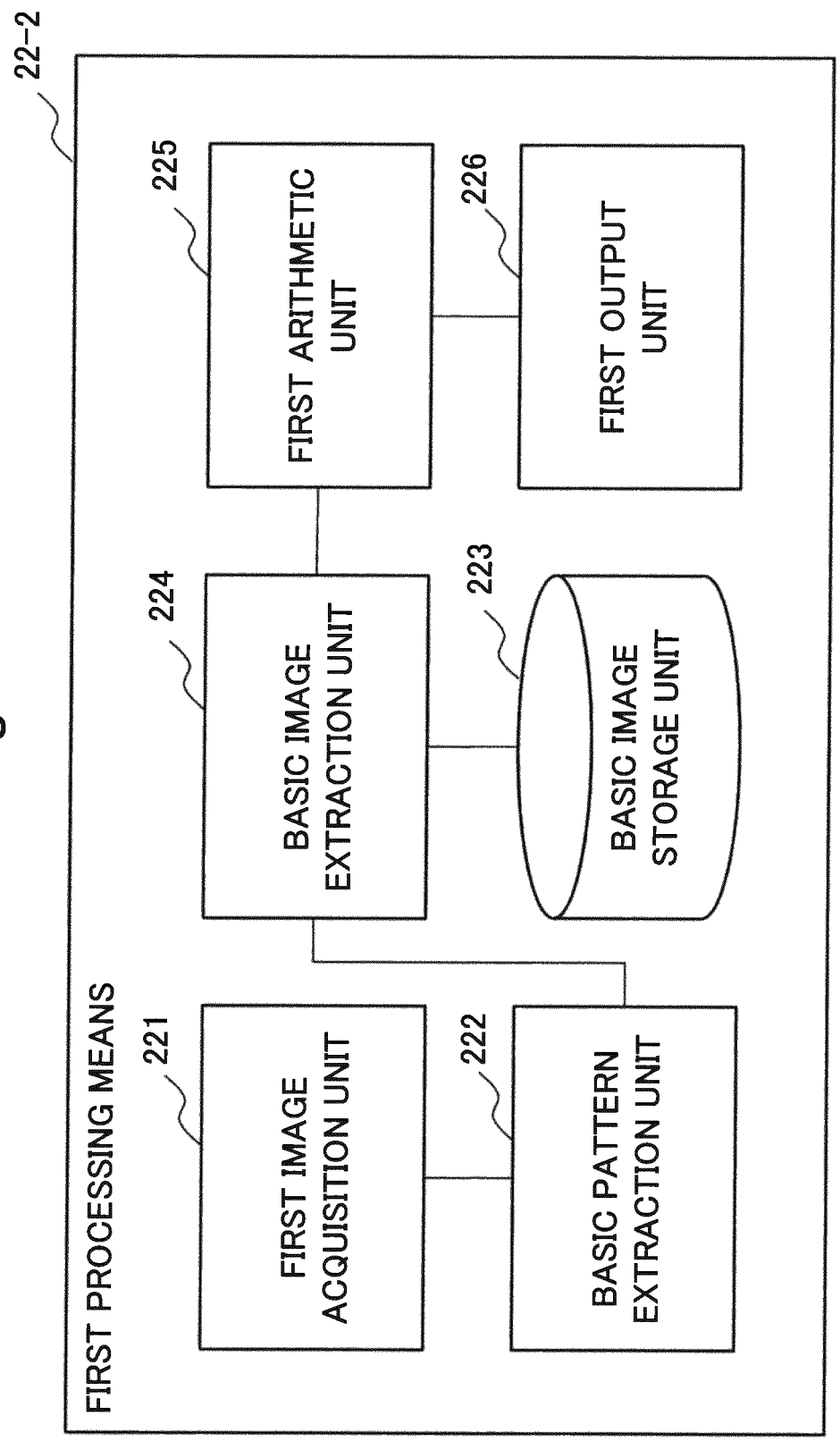
FIG. 9 is a block diagram of a first processing means in the projection device according to the second example embodiment of the present invention.

A configuration of the first processing means 22-2 according to the present example embodiment will be described here referring to drawings. FIG. 9 is a block diagram illustrating a configuration of the first processing means 22-2 according to the present example embodiment.

As illustrated in FIG. 9, the first processing means 22-2 includes a first image acquisition unit 221, a basic pattern extraction unit 222, a basic image storage unit 223, a basic image extraction unit 224, a first arithmetic unit 225, and a first output unit 226.

The first image acquisition unit 221 acquires target image information from the target image reception means 21. The first image acquisition unit 221 outputs the acquired target image information to the basic pattern extraction unit 222.

Further, when acquiring a phase distribution of a basic image from a higher level system, the first image acquisition unit 221 causes the basic image storage unit 223 to record the acquired phase distribution of the basic image.

The target image information may include identification information for identifying a basic image included in the target image. Further, the target image information may include information indicating a state of the basic pattern in the target image. Furthermore, the state of the basic pattern refers to a state of the basic pattern in the target image such as a position, a size, and a direction.

The basic pattern extraction unit 222 acquires target image information and extracts a basic pattern included in the target image.

For example, the basic pattern extraction unit 222 extracts a basic pattern by processing such as template matching. The template matching is processing of scanning a basic pattern as a template on a target image, successively calculating a similarity level at any position on the target image, and detecting a position with a high similarity level. A sum of squared difference (SSD), a sum of absolute difference (SAD), and the like may be used as the similarity level calculation. Further, normalized cross-correlation (NCC), zero-means normalized cross-correlation (ZNCC) or the like may also be used as the similarity level calculation.

Further, for example, the basic pattern extraction unit 222 may extract a basic pattern such as a figure or a symbol from the input target image and decide whether or not the extracted basic pattern is included in a basic image stored in the basic image storage unit 223. However, the detection method of a basic pattern in a target image is not limited to the description above, and any method may be used.

The basic image storage unit 223 stores a phase distribution obtained by performing iterative Fourier transform processing on each basic image. The basic image storage unit 223 may previously acquire a phase distribution of a basic image generated in a higher level system. Furthermore, a phase distribution of a basic image may be configured to be previously generated in the local device and stored in the basic image storage unit 223.

For example, the basic image storage unit 223 may store a phase distribution of each basic image, in association with a unique identifier given to each basic image. Furthermore, the basic image storage unit 223 may store a phase distribution of a basic image including a basic pattern, in association with a unique identifier given to the basic pattern.

The basic image extraction unit 224 extracts from the basic image storage unit 223 a basic image including a basic pattern extracted by the basic pattern extraction unit 222. The basic image extraction unit 224 outputs the extracted basic image to the first arithmetic unit 225.

The first arithmetic unit 225 composites basic images acquired from the basic image extraction unit 224. When changing a position of a basic pattern in a target image, the first arithmetic unit 225 performs movement processing such as translation processing on the basic pattern on the basic image. After moving a basic pattern to a suitable position on every basic image, the first arithmetic unit 225 composites the basic patterns included in the basic images. Furthermore, when a basic image itself corresponds to a target image, the first arithmetic unit 225 does not need to perform movement processing on a phase distribution of the basic image. The first arithmetic unit 225 outputs a phase distribution of the generated target image to the first output unit 226.

The first output unit 226 outputs a phase distribution of a target image on which conversion processing is performed by the first arithmetic unit 225 to the phase distribution switching means 24.

The conversion processing performed by the first arithmetic unit 225 will be described here using examples in FIGS. 10 and 11. Note that, while the first arithmetic unit 225 may perform conversion processing on a phase distribution of a basic image in practice, FIGS. 10 and 11 illustrate basic images related to converted phase distributions.

Figure 10:
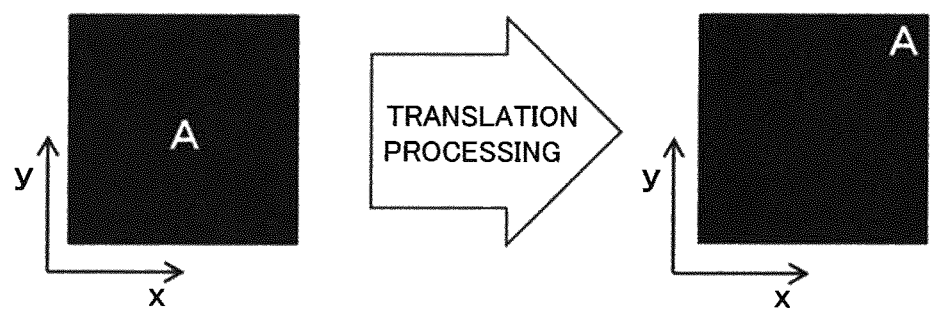
FIG. 10 is a conceptual diagram for illustrating an example of translation processing by the first processing means in the projection device according to the second example embodiment of the present invention.

FIG. 10 is an example of the first arithmetic unit 225 translating a basic pattern A from a center toward an upper-right corner in a basic image. For example, by performing an operation by a phase shift operation (translation processing) on a phase distribution of the basic image including the basic pattern, the first arithmetic unit 225 is able to translate the basic pattern in the basic image. For example, in the phase shift operation, a phase of the basic image may be shifted by multiplying the phase by a phase matrix in each direction of an x-direction and a y-direction.

Figure 11:
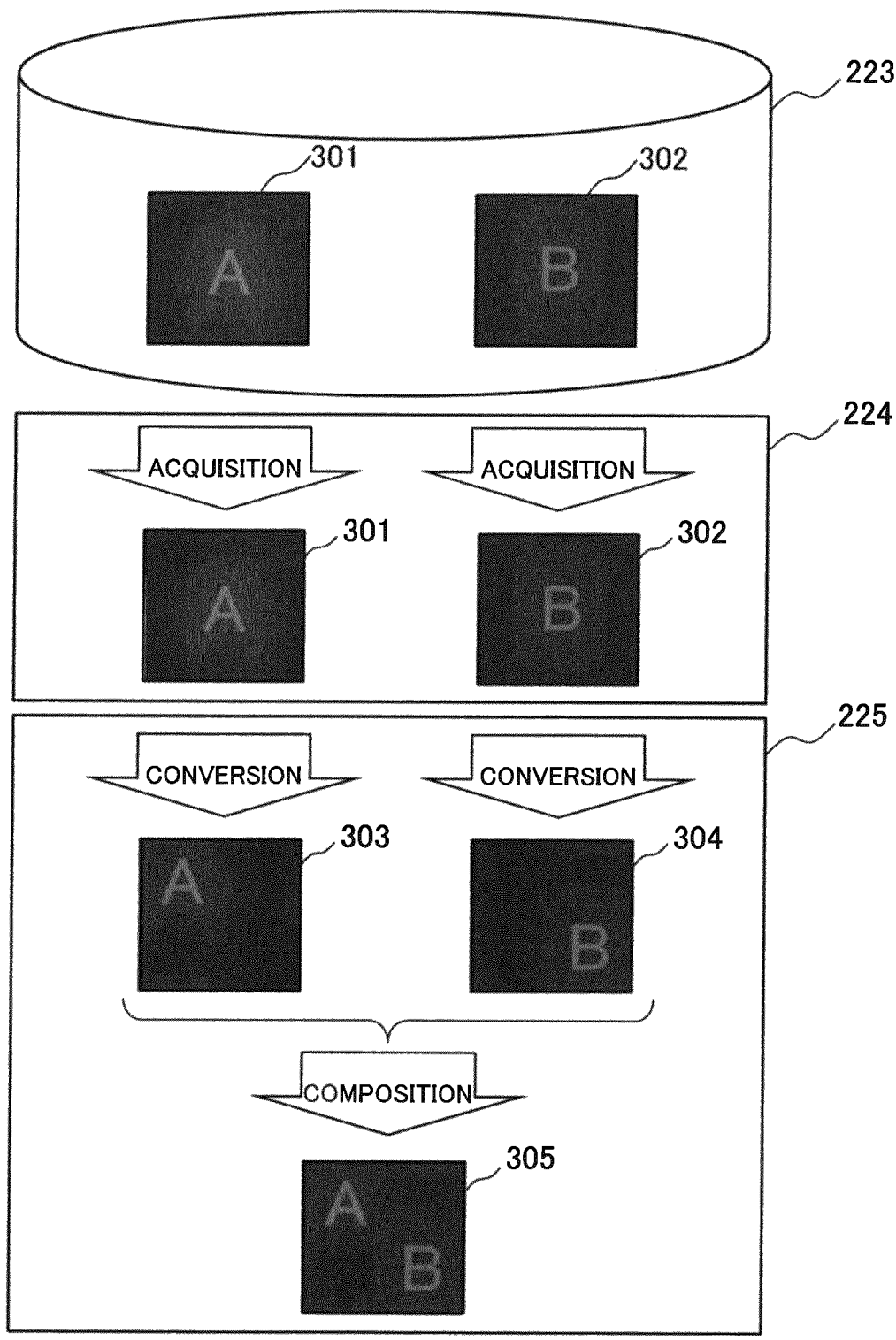
FIG. 11 is a conceptual diagram for illustrating an example of composition processing by the first processing means in the projection device according to the second example embodiment of the present invention.

FIG. 11 is a conceptual diagram illustrating a flow of first processing of generating a basic image from basic patterns A and B.

The basic image extraction unit 224 extracts a phase distribution of a basic image 301 including the basic pattern A and a phase distribution of a basic image 302 including the basic pattern B from the basic image storage unit 223.

The first arithmetic unit 225 generates a phase distribution of a basic image 303 obtained by moving the basic pattern A on the basic image 301 and also generates a phase distribution of a basic image 304 obtained by moving the basic pattern B on the basic image 302. Then, the first arithmetic unit 225 composites the generated phase distributions of the basic images 303 and 304 and generates a target image 305.

(Second Processing Means)

Figure 12:
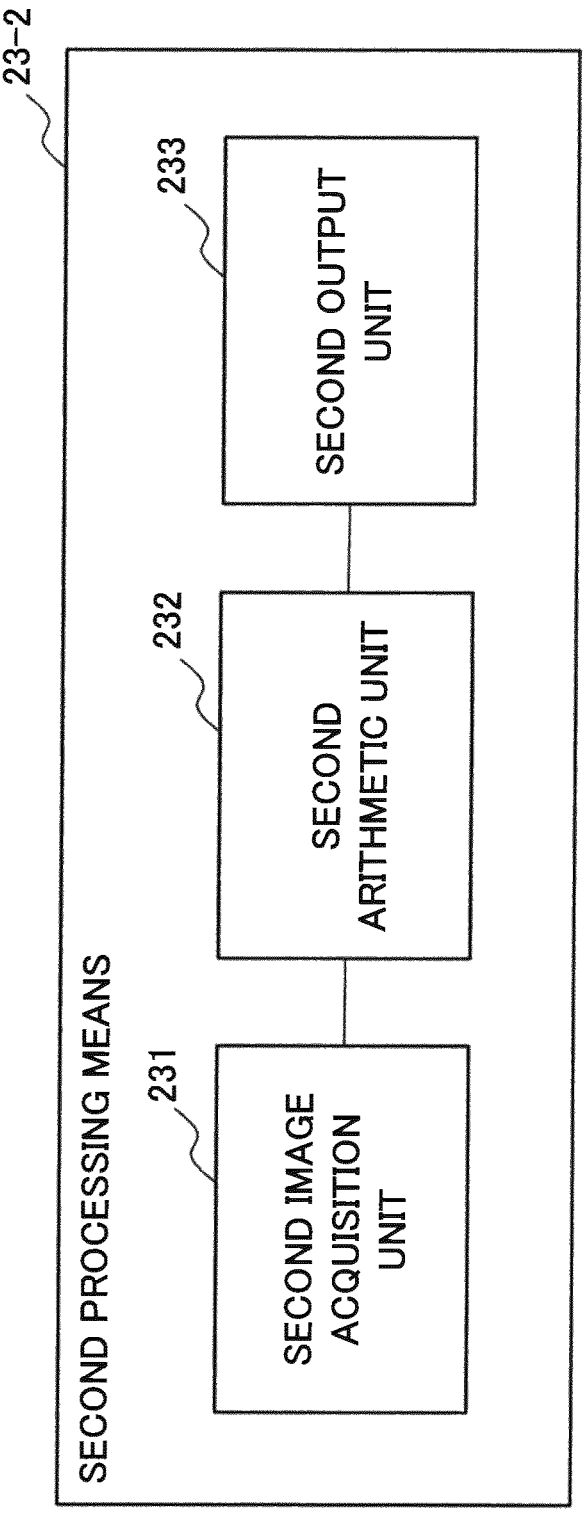
FIG. 12 is a block diagram of a second processing means in the projection device according to the second example embodiment of the present invention.

Next, a configuration of the second processing means 23-2 according to the present example embodiment will be described referring to a drawing. FIG. 12 is a block diagram illustrating a configuration of the second processing means 23-2 according to the present example embodiment.

As illustrated in FIG. 12, the second processing means 23-2 includes a second image acquisition unit 231, a second arithmetic unit 232, and a second output unit 233.

The second image acquisition unit 231 acquires target image information from the target image reception means 21. The second image acquisition unit 231 outputs the acquired target image information to the second arithmetic unit 232.

The second arithmetic unit 232 acquires target image information and performs iterative Fourier transform processing by using a target image included in the acquired target image information and generates a phase distribution of the target image.

The second output unit 233 outputs a phase distribution of a target image generated by the second arithmetic unit 232 to the phase distribution switching means 24.

(Iterative Fourier Transform Processing)

Figure 13:
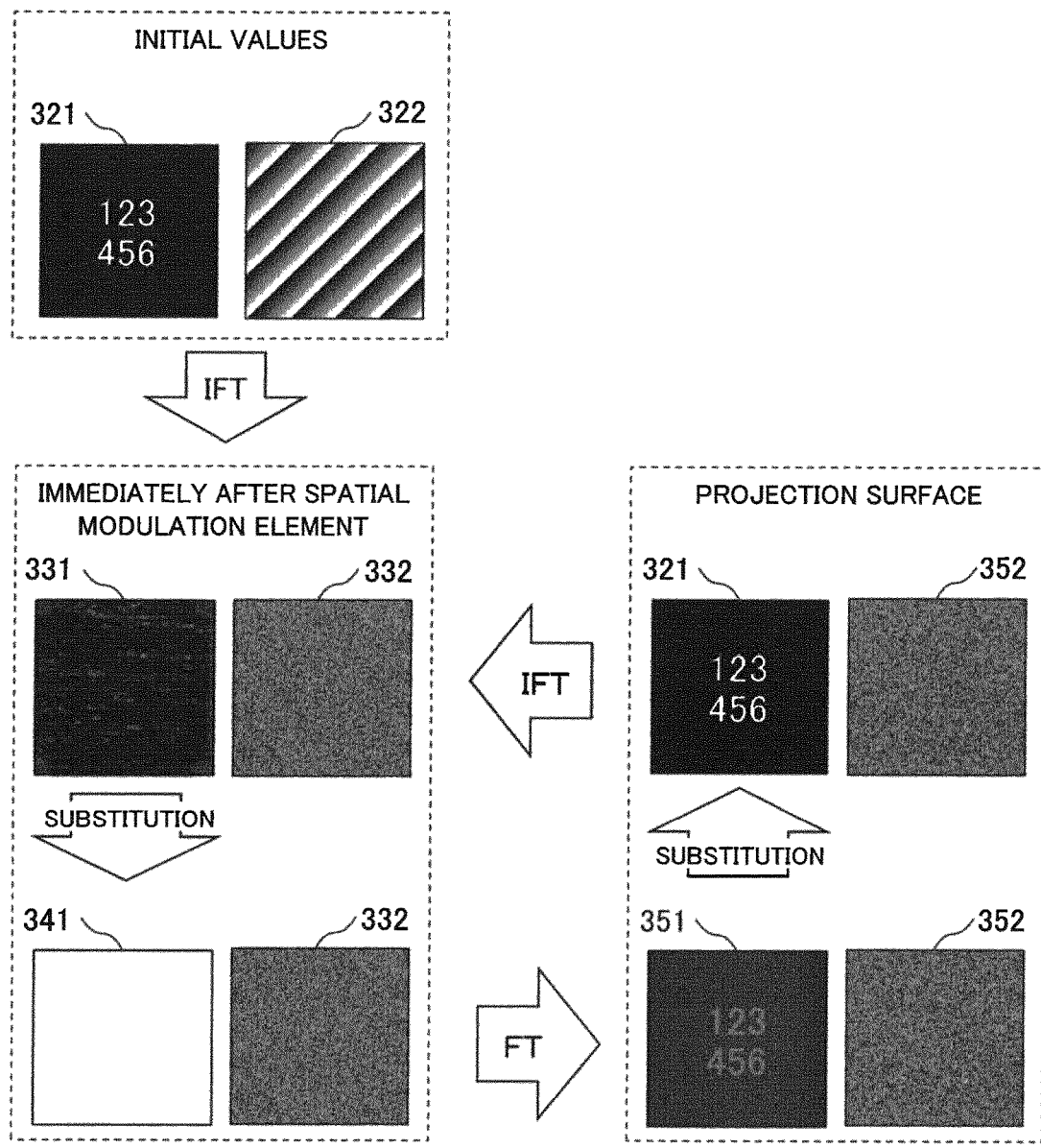
FIG. 13 is a conceptual diagram illustrating an example of iterative Fourier transform processing by the second processing means in the projection device according to the second example embodiment of the present invention.

Iterative Fourier transform processing performed by the second arithmetic unit 232 will be described here. FIG. 13 is a conceptual diagram for illustrating the iterative Fourier transform processing. Note that each phase distribution illustrated in FIG. 13 is a dummy pattern, and even when the dummy patterns are displayed on the display surface of the spatial modulation element 13 and light is irradiated on the display surface, a target image of any kind may not necessarily be obtained. Further, in FIG. 13, FT denotes a Fourier transform and IFT denotes an inverse Fourier transform.

A photoelectric field distribution E on the projection surface is obtained by performing a Fourier transform on a photoelectric field distribution immediately after the spatial modulation element 13. A square of the photoelectric field distribution E on the projection surface corresponds to a light intensity distribution of a target image. Conversely, a photoelectric field distribution immediately after the spatial modulation element is obtained by performing an inverse Fourier transform on a photoelectric field distribution E on the projection surface. In an iterative Fourier transform, optimization is performed by repeating an inverse Fourier transform and a Fourier transform until a phase distribution of the target image is obtained.

Next, using a flowchart in FIG. 14, a flow of the iterative Fourier transform processing will be described. Note that the following description based on FIG. 14 refers to reference signs of amplitude distributions and phase distributions in FIG. 13.

Figure 14:
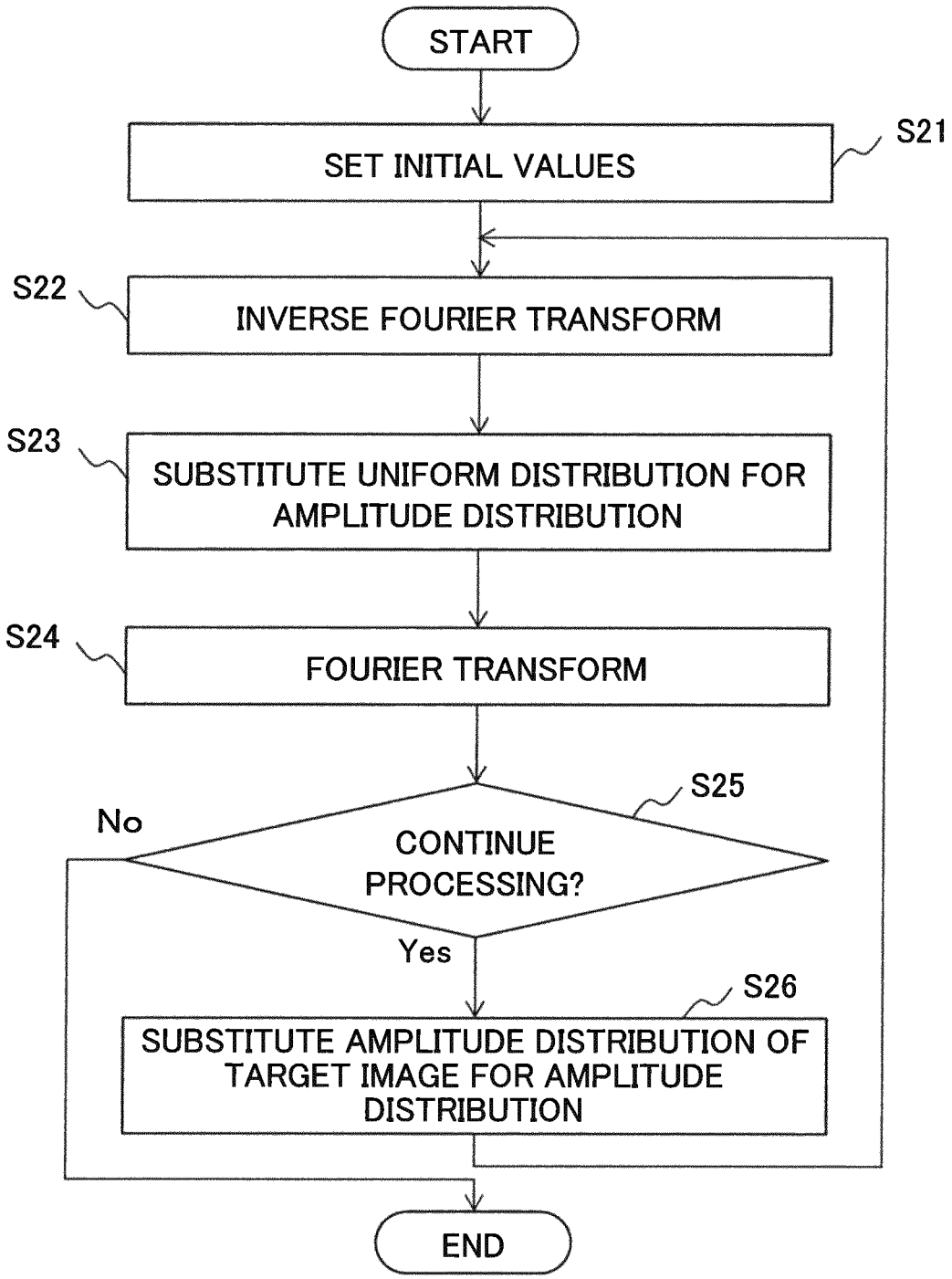
FIG. 14 is a flowchart of the iterative Fourier transform processing by the second processing means in the projection device according to the second example embodiment of the present invention.

First, in FIG. 14, the second arithmetic unit 232 sets an amplitude distribution 321 ($F_O$) of a target image and a suitable phase distribution 322 ($\Delta\Phi_0$) as initial values (Step S21).

The phase distribution 322 ($\Delta\Phi_0$) is a predetermined phase distribution and may have any pattern. For example, the phase distribution 322 ($\Delta\Phi_0$) may have any pattern such as a random pattern, a second-order lenticular pattern, or a linear pattern.

Next, using the acquired amplitude distribution 321 ($F_O$) and phase distribution 322 ($\Delta\Phi_0$), the second arithmetic unit 232 performs an inverse Fourier transform operation (first inverse Fourier transform) and generates an amplitude distribution 331 ($f_1$) and a phase distribution 332 ($\Delta\Phi_1$) (Step S22).

Specifically, in the first inverse Fourier transform, the second arithmetic unit 232 inverse Fourier transforms a photoelectric field distribution obtained by combining the amplitude distribution of the target image with the predetermined phase distribution and generates a photoelectric field distribution immediately after the spatial modulation element 13. Note that the phase distribution 322 ($\Delta\Phi_0$) set as an initial value has a pattern irrelevant to the amplitude distribution 321 ($F_O$), and therefore the amplitude distribution 331 ($f_1$) generated here has a meaningless pattern.

Next, the second arithmetic unit 232 replaces the amplitude distribution 331 ($f_1$) with a suitable pattern. Assuming that uniform laser light is launched into the display surface of the spatial modulation element 13 in the example in FIG. 13, the second arithmetic unit 232 substitutes a uniform amplitude distribution 341 ($f_0$) for the amplitude distribution 331 ($f_1$) (Step S23).

Next, using the uniform amplitude distribution 341 ($f_0$) and the phase distribution 332 ($\Delta\phi_1$), the second arithmetic unit 232 performs a Fourier transform operation (first Fourier transform) and generates an amplitude distribution 351 ($F_1$) and a phase distribution 352 ($\Delta\Phi_1$) (Step S24).

Specifically, in the first Fourier transform, the second arithmetic unit 232 Fourier transforms a photoelectric field distribution obtained by combining the phase distribution generated by the first inverse Fourier transform with the uniform amplitude distribution and generates a photoelectric field distribution of the target image on the projection surface. The amplitude distribution 351 ($F_1$) generated first is an image with a somewhat enhanced edge of the amplitude distribution 321 ($F_O$) of the target image. At this stage, an amplitude distribution of a desired target image is not yet obtained.

When the processing is to be continued (Yes in Step S25), the second arithmetic unit 232 substitutes the amplitude distribution 321 ($F_O$) of the target image for the amplitude distribution 351 ($F_1$) (Step S26). The second arithmetic unit 232 returns to Step S22 after Step S26.

On the other hand, when the processing is to be ended (No in Step S25), the processing based on the flowchart in FIG. 14 is ended. A phase distribution $\Delta\phi$ obtained at this stage is a phase distribution of the target image. For example, a condition (hereinafter referred to as a predetermined condition) to be reached by a light intensity distribution on the projection surface for the iterative Fourier transform to be continued may be previously determined, and the spatial modulation element 13 may be set to be controlled by using the phase distribution $\Delta\phi$ at a stage when the predetermined condition is met.

When the processing is to be continued (Yes in Step S25), the second arithmetic unit 232 returns to Step S22 and, using the amplitude distribution 321 ($F_O$) and the phase distribution 352 ($\Delta\Phi_1$), performs an inverse Fourier transform operation (second inverse Fourier transform) (Step S22).

Specifically, in the second inverse Fourier transform, the second arithmetic unit 232 inverse Fourier transforms a photoelectric field distribution obtained by combining the phase distribution generated by the first Fourier transform with the amplitude distribution of the target image and generates a photoelectric field distribution immediately after the spatial modulation element 13. By using a phase distribution ($\Delta\Phi_2$) obtained at this stage, a light intensity distribution closer to the target image than when using the phase distribution 332 ($\Delta\phi_1$) can be obtained.

Furthermore, the second arithmetic unit 232 substitutes a uniform amplitude distribution 341 ($f_0$) for an amplitude distribution ($f_2$) (Step S23). Using the uniform amplitude distribution 341 ($f_0$) and a phase distribution ($\Delta\Phi_2$), the second arithmetic unit 232 performs a Fourier transform operation (second Fourier transform) and generates an amplitude distribution ($F_3$) and a phase distribution ($\Delta\Phi_3$) (Step S24).

Specifically, in the second Fourier transform, the second arithmetic unit 232 Fourier transforms a photoelectric field distribution obtained by combining the phase distribution generated by the second inverse Fourier transform with the uniform amplitude distribution and generates a photoelectric field distribution on the projection surface. Note that, while the second arithmetic unit 232 performs similar Fourier transform processing in the first and second Fourier transforms, each set of conversion processing is named differently in order to facilitate description.

When the iterative Fourier transform processing is to be continued (Yes in Step S25), the second arithmetic unit 232 substitutes the amplitude distribution 321 ($F_O$) of the target image for an amplitude distribution ($F_4$) (Step S56) and returns to Step S22.

The second arithmetic unit 232 hereinafter repeats the inverse Fourier transform operation (second inverse Fourier transform) and the Fourier transform operation (second Fourier transform processing) (Steps S22 to S26) and calculates a phase distribution $\Delta\phi$ forming a light intensity distribution yet closer to the target image on the projection surface.

Figure 15:
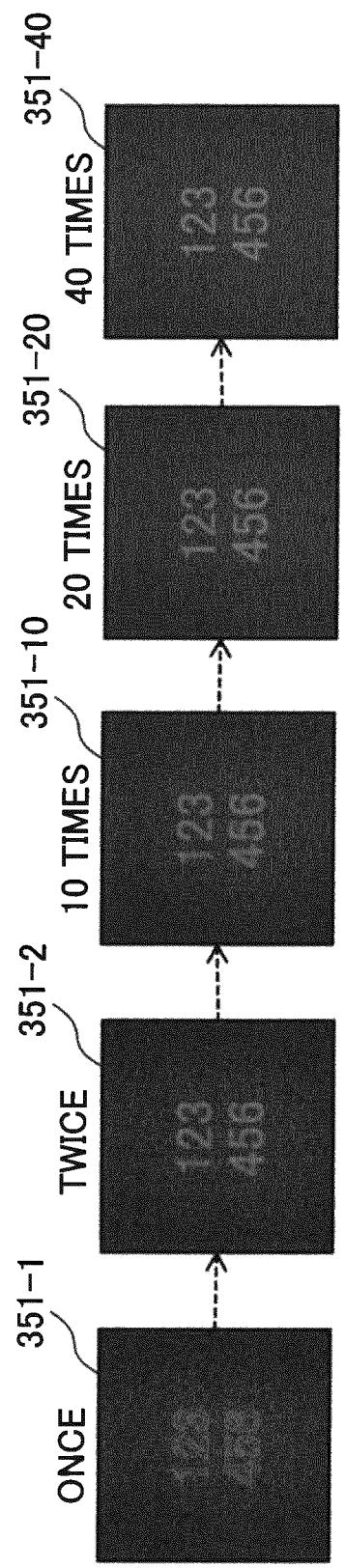
FIG. 15 is a conceptual diagram illustrating transition of a target image, the transition being related to an iteration count in the iterative Fourier transform processing by the second processing means in the projection device according to the second example embodiment of the present invention.

FIG. 15 is a conceptual diagram illustrating changes in an amplitude distribution of the target image, the changes being related to an iteration count of the iterative Fourier transform processing. In FIG. 15, an amplitude distribution 351-1 is an amplitude distribution when the iterative Fourier transform processing is performed once. A number following a hyphen after the amplitude distribution 351 denotes an iteration count. Specifically, amplitude distributions 351-2, 351-10, 351-20, and 351-40 are amplitude distributions after repeating the iterative Fourier transform processing twice, 10 times, 20 times, and 40 times, respectively.

It can be understood that, by repeating the iterative Fourier transform processing, the resulting distribution gets closer to the target image, as illustrated in FIG. 15. However, the iterative Fourier transform processing becomes saturated when repeated a certain number of times, and therefore a light intensity distribution completely matching the target image cannot be obtained. Accordingly, the second arithmetic unit 232 performs optimization until a target phase distribution is obtained while repeating an inverse Fourier transform and an iterative Fourier transform. For example, a criterial state of an amplitude distribution generated by a Fourier transform for ending the iteration and a criterial count of iterative Fourier transforms may be set. Further, for example, a Fourier error and an object error may be set as error functions for evaluating a degree of convergence in each iteration, and a determination on whether to end the iteration may be made by a decision criterion using the error function.

As described above, the iterative Fourier transform processing optimizes a phase distribution until a desired target image is obtained, by setting initial values and repeatedly performing an inverse Fourier transform and a Fourier transform. Note that the aforementioned description of the iterative Fourier transform processing is an example and does not limit a processing algorithm being actually used to the aforementioned technique, and various types of processing may be added or deleted.

As described above, the present example embodiment performs first processing using a phase distribution of a previously acquired basic image and displays a primary indication on the display surface of the spatial modulation element by using the phase distribution obtained in the first processing. The first processing extracts a basic image including a basic pattern included in a target image and generates a phase distribution of the target image by performing composition processing and the like on the extracted basic image.

Then, in parallel with the first processing, the present example embodiment performs second processing using the target image and displays a secondary indication on the display surface of the spatial modulation element by using a phase distribution obtained in the second processing. The second processing performs iterative Fourier transform processing by using the target image and generates a phase distribution of a desired target image. A timing at which the primary indication is switched to the secondary indication may be set at a time after the target image obtained in the second processing meets a predetermined decision criterion.

In other words, the present example embodiment performs the first processing with a lower calculation cost and the second processing with a higher calculation cost in parallel and first displays a phase distribution obtained in the first processing as a primary indication. Then, when a phase distribution of a high-quality target image is obtained by the second processing, the present example embodiment switches the primary indication to a secondary indication using the phase distribution and displays the secondary indication.

The present example embodiment is able to quickly display a desired target image and switch the target image to a higher quality image.

Modified Example

Next, using FIGS. 16 and 17, a modified example of the projection device according to the present example embodiment will be described.

Figure 16:
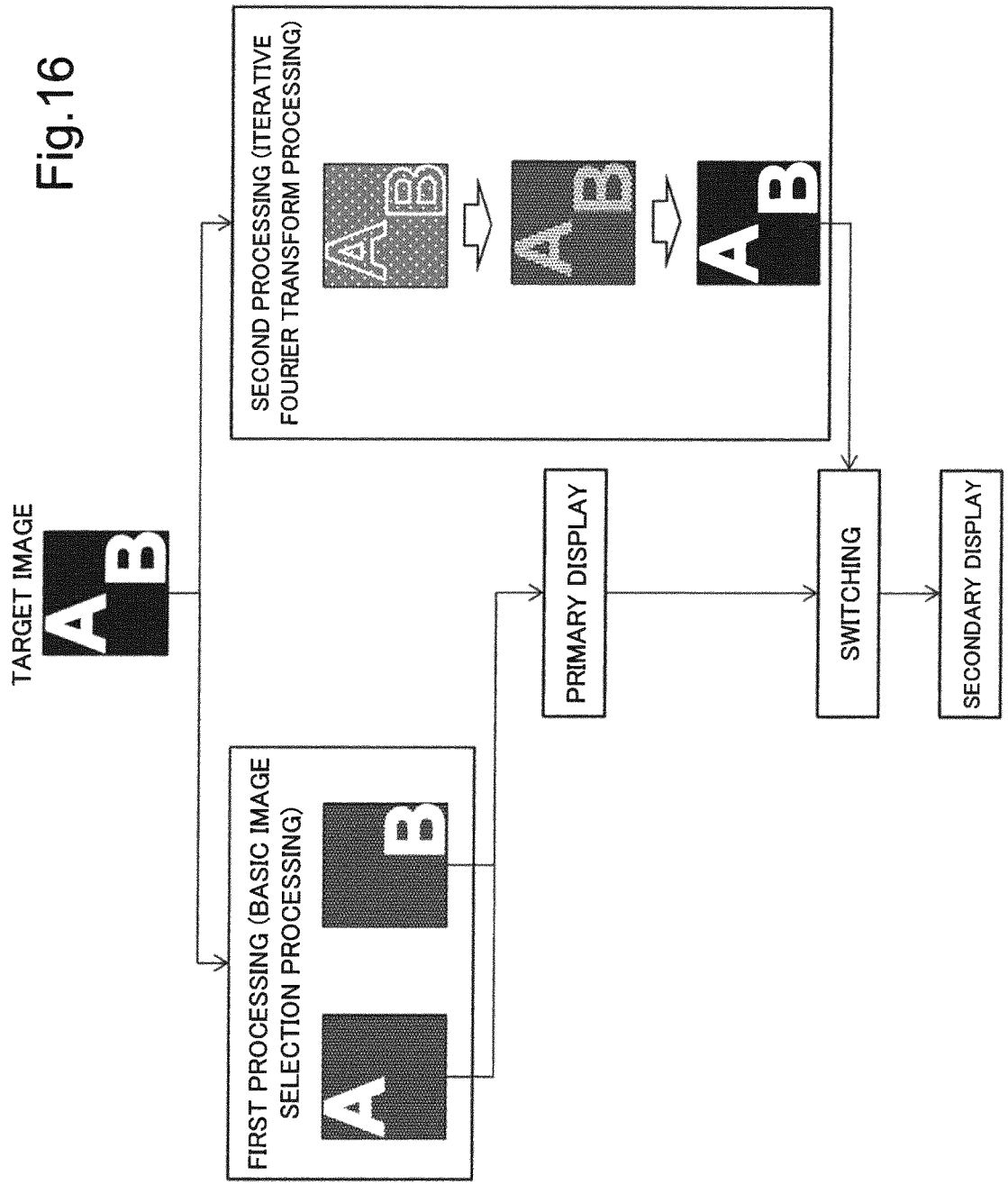
FIG. 16 is a conceptual diagram for illustrating switching of a phase distribution displayed on the display surface of the spatial modulation element in the projection device according to the second example embodiment of the present invention.

FIG. 16 is a conceptual diagram for illustrating a modified example of the processing performed by the projection device according to the present example embodiment. Further, FIG. 17 is an example of displaying a phase distribution generated by using the method in FIG. 16 on a display surface of a spatial modulation element 13. Note that, while a phase distribution is displayed on the display surface of the spatial modulation element 13 in practice, an image displayed on a projection surface by using a phase distribution displayed on the display surface of the spatial modulation element 13 is illustrated in each display area in the example in FIG. 17, in order to facilitate description.

Figure 17:
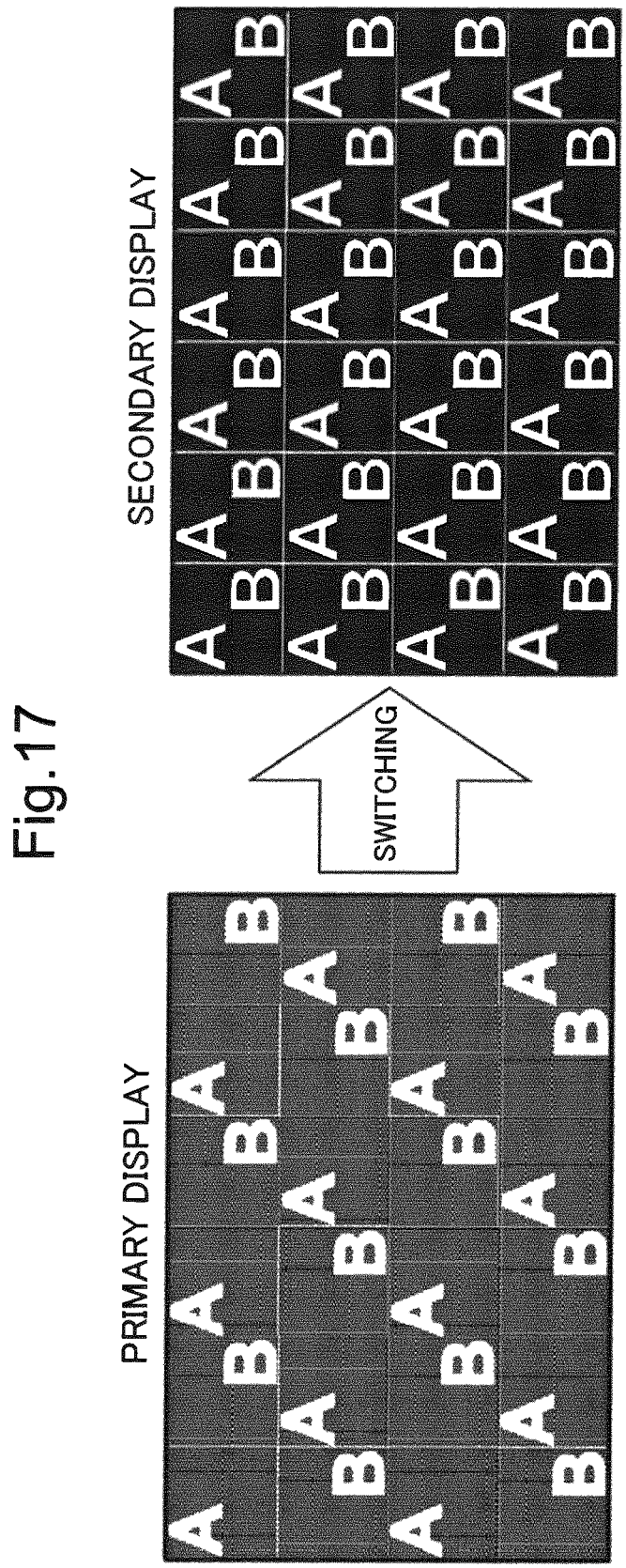
FIG. 17 is a conceptual diagram illustrating an example of switching a phase distribution displayed on the display surface of the spatial modulation element in the projection device according to the second example embodiment of the present invention.

In the examples in FIGS. 16 and 17, a first processing means 22-2 performs processing of selecting a phase distribution of a basic image as first processing. Further, a second processing means 23-2 performs iterative Fourier transform processing using a target image as second processing.

In the examples in FIGS. 16 and 17, display areas on the display surface of the spatial modulation element 13 are grouped into two display area groups. Then, a phase distribution of a basic image including a basic pattern A is displayed on one display area group, and a phase distribution of a basic image including a basic pattern B is displayed on the other display area group. In other words, the examples in FIGS. 16 and 17 differ from the examples in FIGS. 6 and 7 in displaying a basic image including a different basic pattern for each of a plurality of display area groups, without performing composition processing of basic images.

In FIGS. 16 and 17, first, the projection device according to the present example embodiment displays a phase distribution generated by the first processing means 22-2 on the display surface of the spatial modulation element 13 as a primary indication.

As illustrated in FIG. 16, the first processing means 22-2 selects a phase distribution of a basic image including a basic pattern from an acquired target image. The first processing means 22-2 previously stores a phase distribution of a basic image including each basic pattern.

The left-hand part of FIG. 17 is an example of a primary indication. Unlike FIG. 7, a phase distribution of a basic image including one of the two basic patterns A and B is displayed as is on each display area. A phase control means 30 performs control in such a way that the phase distribution selected by the first processing means 22-2 is displayed on each display area as a primary indication.

In the example in FIG. 17, the phase control means 30 groups a plurality of display areas into two display area groups. The phase control means 30 performs control in such a way that a phase distribution of a basic image including the basic pattern A is displayed on one display area group and a phase distribution of a basic image including the basic pattern B is displayed on the other display area. While the example in FIG. 17 illustrates an example of alternately displaying the basic patterns A and B, the basic patterns may be displayed on any display areas.

When phase distributions of the basic images as illustrated in FIG. 17 are displayed on the display surface of the spatial modulation element 13, reflected light from the display surface is converted into a target image being a composite of the two basic patterns and is displayed on the display surface.

Subsequently, the projection device according to the present example embodiment displays a phase distribution generated by the second processing means 23-2 on the display surface of the spatial modulation element 13.

As illustrated in FIG. 16, by using the acquired target image, the second processing means 23-2 generates a phase distribution related to the target image. FIG. 16 illustrates a state of a phase distribution of a clearer target image being obtained by iteration of iterative Fourier transform processing. The second processing means 23-2 outputs a phase distribution generated by a predetermined number of iterations of iterative Fourier transform processing to the phase distribution switching means 24. Furthermore, the second processing means 23-2 may successively output phase distributions generated at intermediate stages in the predetermined number of iterations of iterative Fourier transform processing.

The phase distribution switching means 24 switches the phase distribution used by the primary indication to the phase distribution generated by the second processing means 23-2.

The right-hand part of FIG. 17 is an example of a secondary indication. The phase control means 30 performs control in such a way that the phase distribution switched by the phase distribution switching means 24 is displayed on each display area as a secondary indication.

In the examples in FIGS. 16 and 17, an amount of light reflected on the display surface for each basic pattern is reduced by half, and therefore brightness of the target image is reduced by around half at the primary indication stage compared with a case of a same phase distribution being displayed on every display area. By contrast, a same phase distribution is displayed on every display area in the case of the secondary indication, and therefore brightness of the target image becomes around twice as much as that of the primary indication. Switching the primary indication to the secondary indication as is causes a sudden change in the brightness. In order to improve such a point, processing of reducing an amount of light from a light source 11 by around half or dimming the phase distribution used for the secondary indication may be performed at the switching from the primary indication to the secondary indication.

The present modified example is able to omit processing of compositing basic images, and therefore is able to display a primary indication more rapidly than the examples in FIGS. 6 and 7.

(Third Example Embodiment)

Next, a projection device according to a third example embodiment of the present invention will be described referring to drawings. The present example embodiment differs from the second example embodiment in adding another basic pattern to a target image already generated in first processing. Note that a configuration of the projection device according to the present example embodiment is similar to that of the projection device according to the second example embodiment, and therefore a drawing thereof is omitted.

Figure 18:
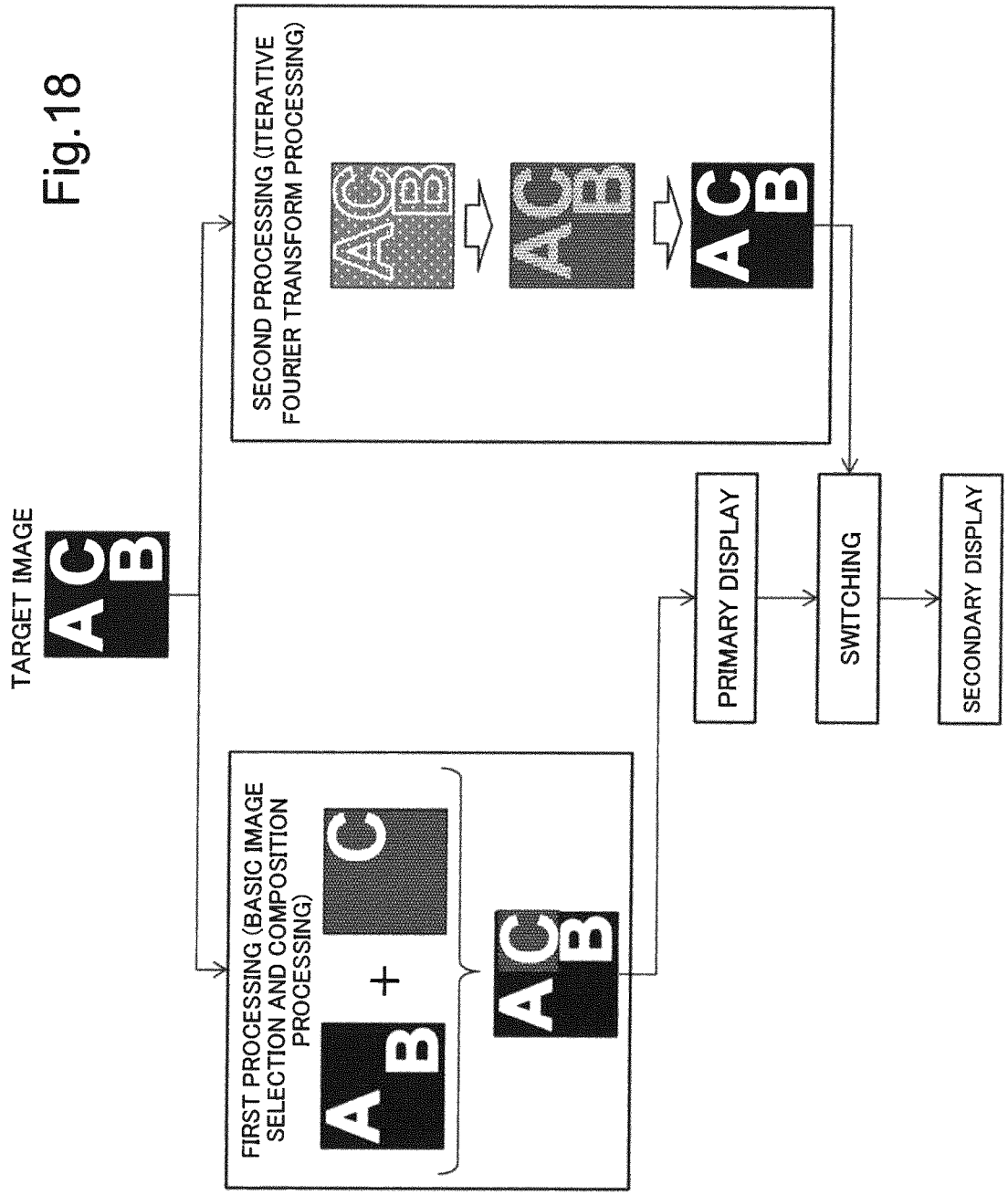
FIG. 18 is a conceptual diagram for illustrating switching of a phase distribution displayed on a display surface of a spatial modulation element in a projection device according to a third example embodiment of the present invention.
Figure 19:
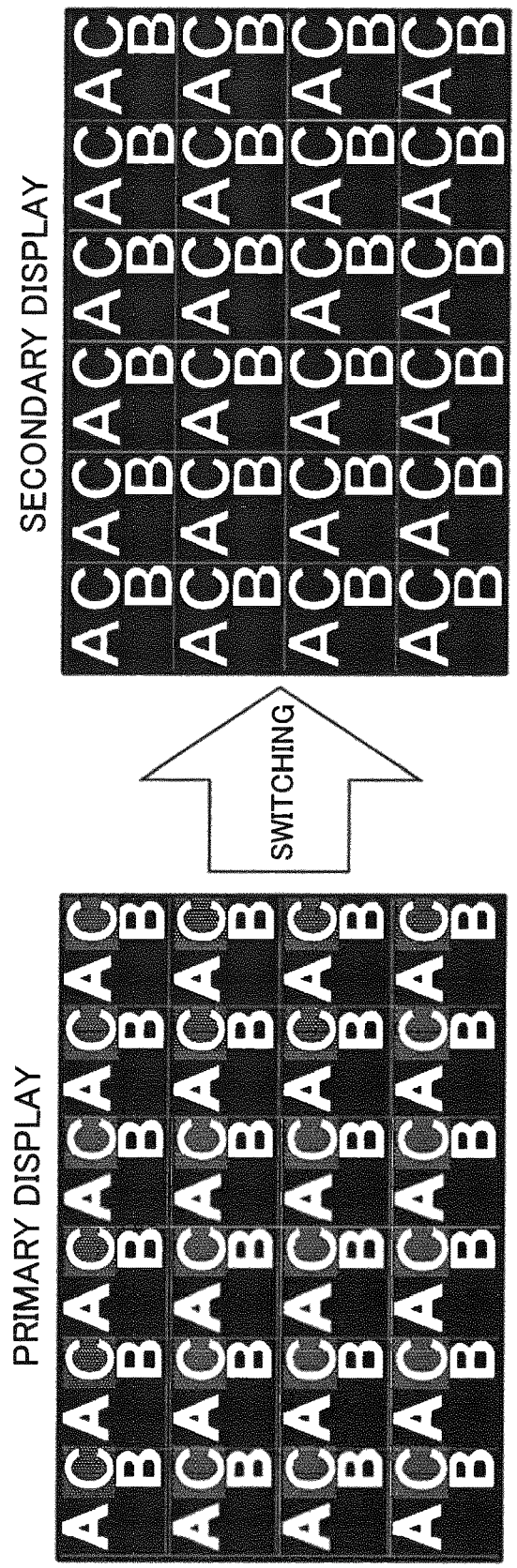
FIG. 19 is a conceptual diagram illustrating an example of switching a phase distribution displayed on the display surface of the spatial modulation element in the projection device according to the third example embodiment of the present invention.

FIG. 18 is a conceptual diagram for illustrating processing performed by the projection device according to the present example embodiment. Further, FIG. 19 is an example of displaying a phase distribution generated by the processing in FIG. 18 on a display surface of a spatial modulation element 13. Note that, while a phase distribution is displayed on the display surface of the spatial modulation element 13 in practice, an image displayed on a projection surface when a phase distribution displayed on the display surface of the spatial modulation element 13 is used is illustrated in each display area in the example in FIG. 19.

A first processing means according to the present example embodiment performs processing of selecting a phase distribution of a separate basic image and compositing the phase distribution with an already-generated phase distribution of a target image as first processing. Further, a second processing means performs iterative Fourier transform processing using a target image as second processing.

First, the projection device according to the present example embodiment displays a phase distribution generated by the first processing means on the display surface of the spatial modulation element 13 as a primary indication. A target image including basic patterns A and B is already generated, and processing of adding another basic pattern C to the target image is performed as first processing, according to the present example embodiment.

As illustrated in FIG. 18, the first processing means extracts a basic pattern from an acquired target image and selects a phase distribution of a basic image including the basic pattern. The first processing means previously stores a phase distribution of a basic image of each basic pattern. It is assumed in the example in FIG. 18 that, with regard to the three basic patterns, a phase distribution of a target image including the basic patterns A and B is already generated. The first processing means generates a phase distribution of the target image by adding a new basic pattern C to the already-generated phase distribution of the target image.

The left-hand part of FIG. 19 is an example of a primary indication. A phase control means 30 performs control in such a way that a phase distribution selected and composited by the first processing means is displayed on each display area as a primary indication.

Subsequently, the projection device according to the present example embodiment displays a phase distribution generated by the second processing means on the display surface of the spatial modulation element 13.

As illustrated in FIG. 18, by using the acquired target image, the second processing means generates a phase distribution of the target image. FIG. 18 illustrates a state of a phase distribution of a clearer target image being obtained by iteration of iterative Fourier transform processing. The second processing means outputs a phase distribution generated by a predetermined number of iterations of iterative Fourier transform processing to a phase distribution switching means 24. Furthermore, the second processing means may successively output phase distributions generated at intermediate stages in the predetermined number of iterations of iterative Fourier transform processing.

The phase distribution switching means 24 switches the phase distribution used by the primary indication to the phase distribution generated by the second processing means.

The right-hand part of FIG. 19 is an example of a secondary indication. The phase control means 30 performs control in such a way that the phase distribution switched by the phase distribution switching means 24 is displayed on each display area as a secondary indication.

As illustrated in FIG. 19, a phase distribution generated by adding a basic image including a separate basic pattern to an already-generated phase distribution of a target image may generate a target image causing a feeling of strangeness due to differences in contrast and resolution. However, the present example embodiment is able to obtain a primary indication clearer than that obtained by compositing three basic patterns by using separate basic images.

Accordingly, when displaying a primary indication of a target image including a plurality of basic patterns, the present example embodiment is able to obtain an image cleaner than that obtained by compositing the plurality of basic patterns by using separate basic images.

modified example

Using FIGS. 20 and 21, modified examples of FIGS. 18 and 19 will be described here.

Figure 20:
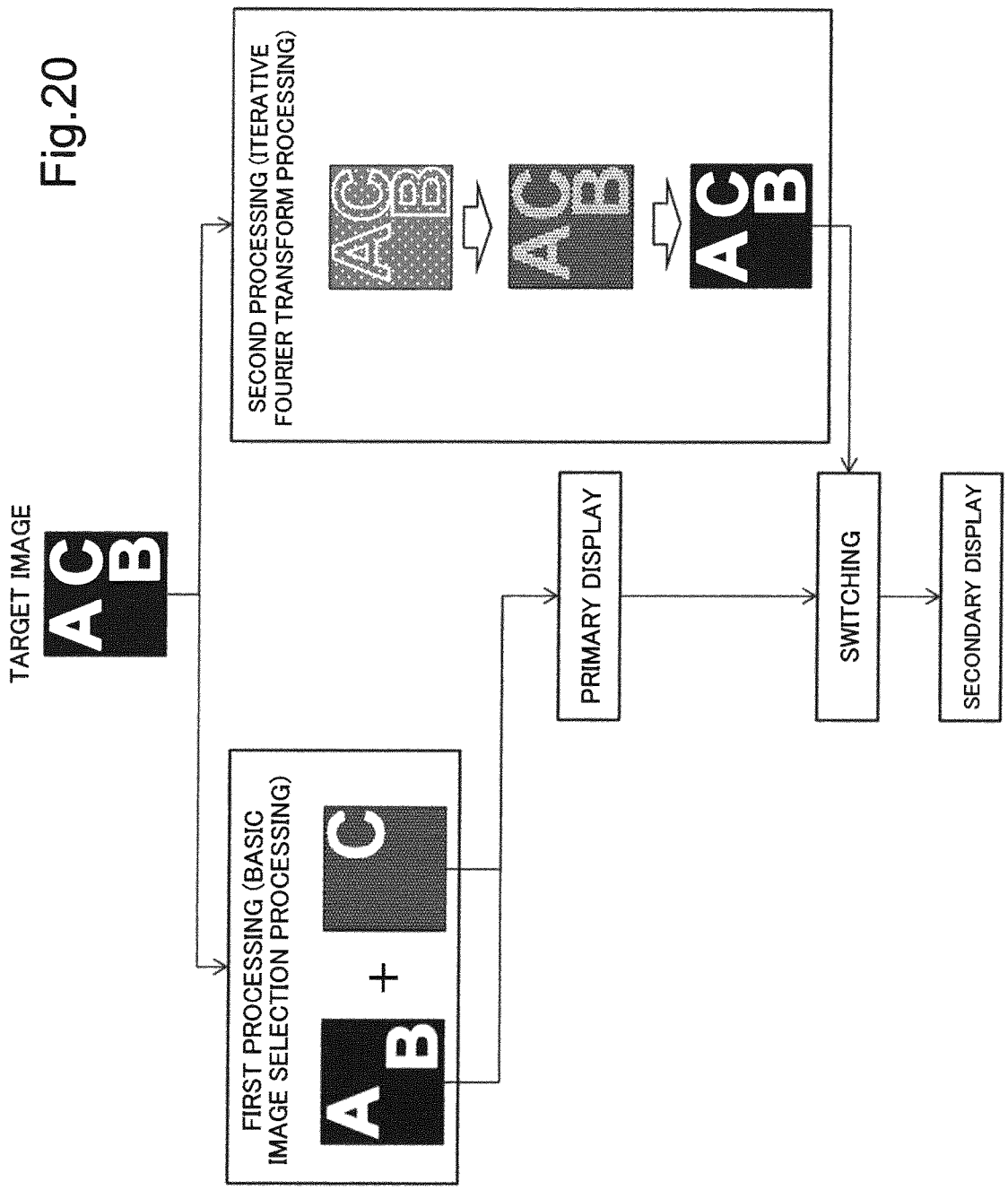
FIG. 20 is a conceptual diagram for illustrating switching of a phase distribution displayed on the display surface of the spatial modulation element in the projection device according to the third example embodiment of the present invention.

FIG. 20 is a conceptual diagram for illustrating a modified example of the processing performed by the projection device according to the present example embodiment. Further, FIG. 21 is an example of displaying a phase distribution generated by performing the processing in FIG. 20 on the display surface of the spatial modulation element 13. Note that, while a phase distribution is displayed on the display surface of the spatial modulation element 13 in practice, an image displayed on the projection surface when a phase distribution displayed on the display surface of the spatial modulation element 13 is used is illustrated in each display area in the example in FIG. 21.

Figure 21:
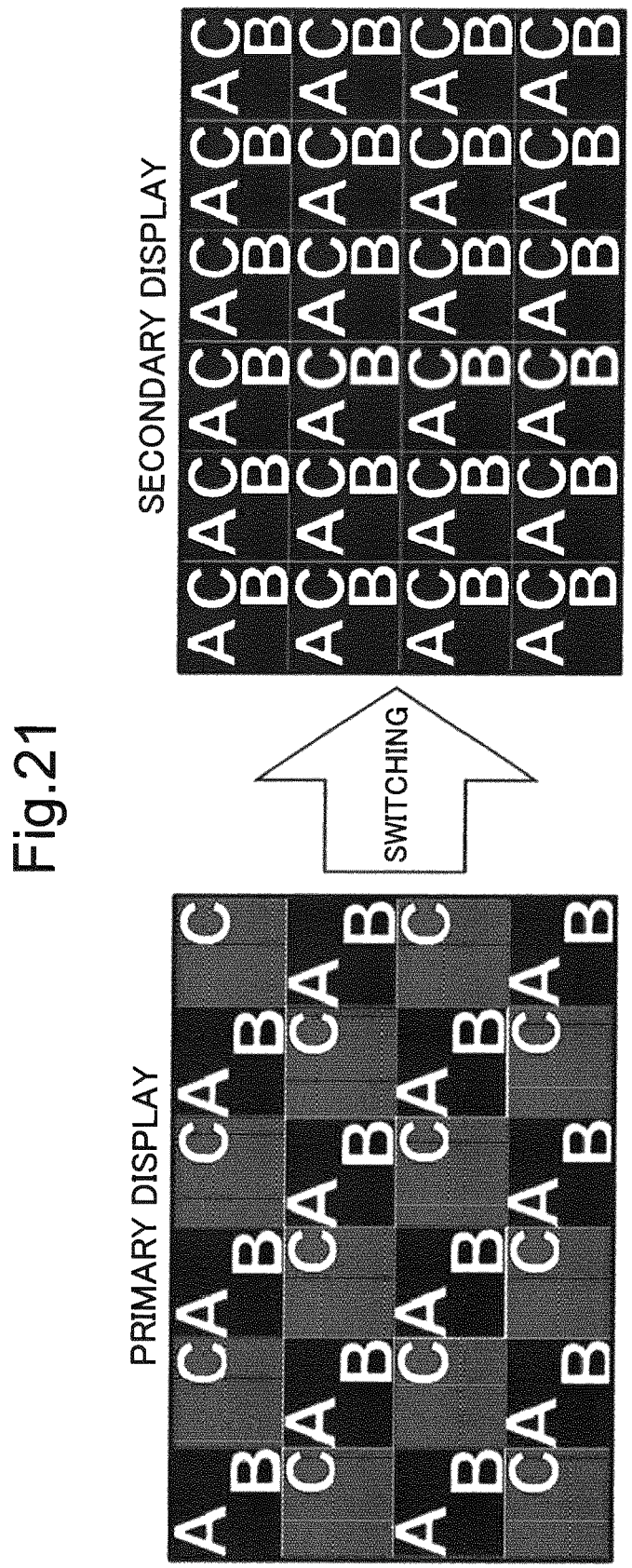
FIG. 21 is a conceptual diagram illustrating an example of switching a phase distribution displayed on the display surface of the spatial modulation element in the projection device according to the third example embodiment of the present invention.

In the examples in FIGS. 20 and 21, the first processing means performs processing of selecting a phase distribution of a basic image as first processing. Further, the second processing means 23 performs iterative Fourier transform processing using a target image as second processing.

In the examples in FIGS. 20 and 21, display areas on the display surface of the spatial modulation element 13 are grouped into two display area groups, and a basic image including basic patterns A and B is displayed on one display area group and a basic image including a basic pattern C is displayed on the other display area group. In other words, the examples in FIGS. 20 and 21 differ from the examples in FIGS. 18 and 19 in displaying a basic image including a different basic pattern for each of a plurality of display area groups, without performing processing of compositing an already-generated target image with a basic image to be added.

In FIGS. 20 and 21, first, the projection device according to the present example embodiment displays a phase distribution generated by the first processing means on the display surface of the spatial modulation element 13 as a primary indication.

As illustrated in FIG. 20, the first processing means extracts a basic pattern from the acquired target image and selects a phase distribution of a basic image including the basic pattern. The first processing means selects a phase distribution of an already-generated image including the basic patterns A and B, and a phase distribution of a basic image including the basic pattern C.

The left-hand part of FIG. 21 is an example of a primary indication. Unlike FIG. 19, the phase distribution of the image including the two basic patterns A and B, and the phase distribution of the basic image including the basic pattern C are displayed on the respective display areas without being composited. The phase control means 30 performs control in such a way that the phase distributions selected by the first processing means are displayed on the respective display area as a primary indication.

In the example in FIG. 21, the phase control means 30 groups a plurality of display areas into two display area groups. The phase control means 30 performs control in such a way that the phase distribution of the image including the basic patterns A and B is displayed on one display area group, and the phase distribution of the basic image including the basic pattern C is displayed on the other display area.

When the basic images as illustrated in FIG. 21 are displayed on the display surface of the spatial modulation element 13, reflected light from the display surface displays a target image in which the two images are composited.

Subsequently, the projection device according to the present example embodiment displays a phase distribution generated by the second processing means on the display surface of the spatial modulation element 13.

As illustrated in FIG. 20, by using the acquired target image, the second processing means generates a phase distribution related to the target image. FIG. 20 illustrates a state of a phase distribution of a clearer target image being obtained by iteration of iterative Fourier transform processing. The second processing means outputs a phase distribution generated by a predetermined number of iterations of iterative Fourier transform processing to the phase distribution switching means 24. Furthermore, the second processing means may successively output phase distributions generated at intermediate stages in the predetermined number of iterations of iterative Fourier transform processing.

The phase distribution switching means 24 switches the phase distribution used by the primary indication to the phase distribution generated by the second processing means.

The right-hand part of FIG. 21 is an example of a secondary indication. The phase control means 30 performs control in such a way that the phase distribution switched by the phase distribution switching means 24 is displayed on each display area as a secondary indication.

The present modified example is able to omit processing of compositing basic images, and therefore is able to display a primary indication more rapidly than the examples in FIGS. 18 and 19. Further, the present modified example displays a phase distribution of an already-displayed image and a phase distribution of a basic image to be added in an overlapping manner, and therefore is able to display an image in which noise in each basic pattern cancels out one another.

(Fourth Example Embodiment)

Next, a projection device according to a fourth example embodiment of the present invention will be described referring to drawings. The present example embodiment differs from the second example embodiment in that, while same processing is performed in both first processing and second processing, a phase distribution of a low-resolution target image is generated in the first processing, and a phase distribution of a high-resolution target image is generated in the second processing. Note that a configuration of the projection device according to the present example embodiment is similar to that of the projection device according to the second example embodiment, and therefore a drawing thereof is omitted. However, some component in the projection device according to the present example embodiment has a function partially different from the component in the projection device according to the second example embodiment.

Figure 22:
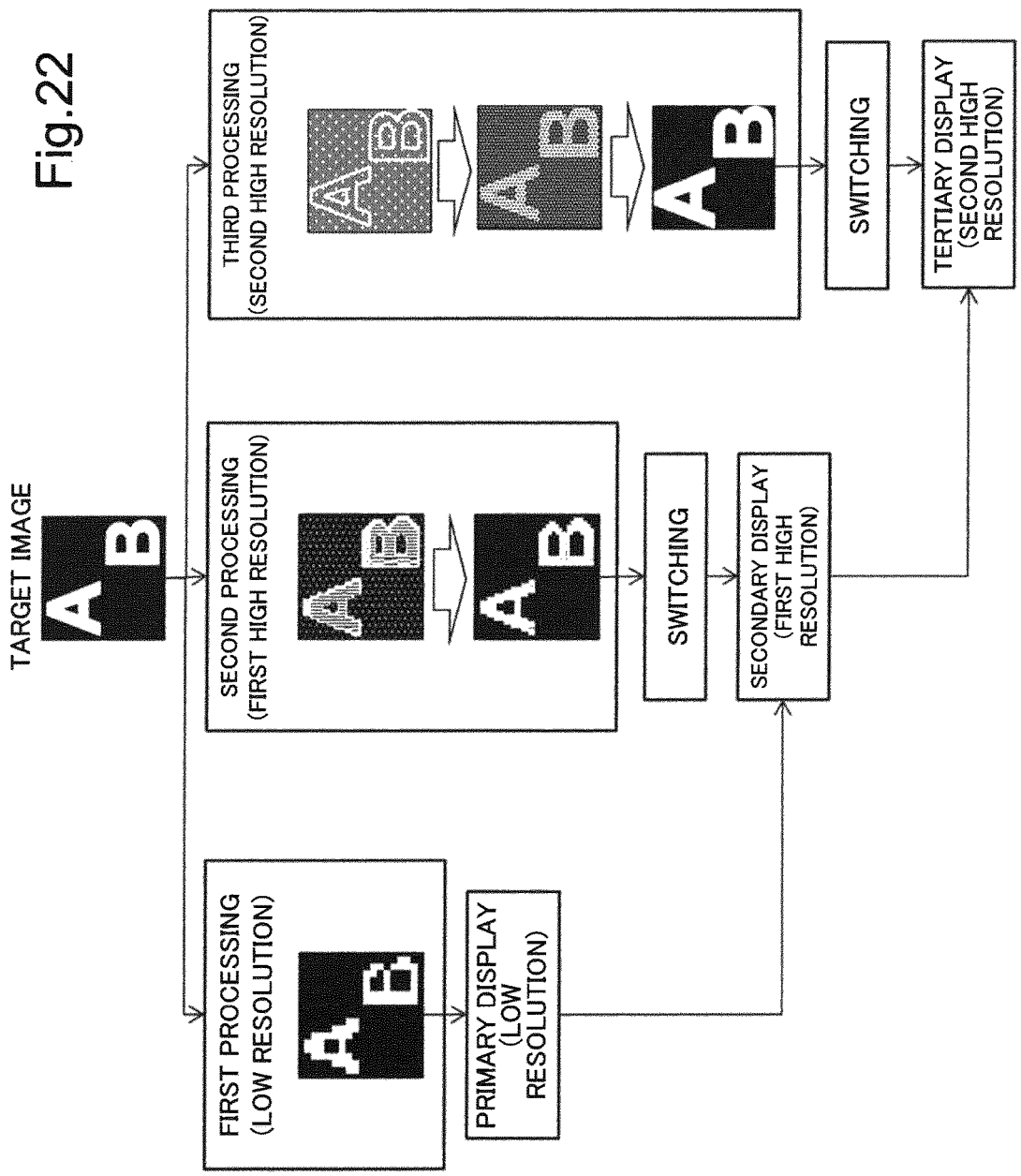
FIG. 22 is a conceptual diagram for illustrating switching of a phase distribution displayed on a display surface of a spatial modulation element in a projection device according to a fourth example embodiment of the present invention.
Figure 23:
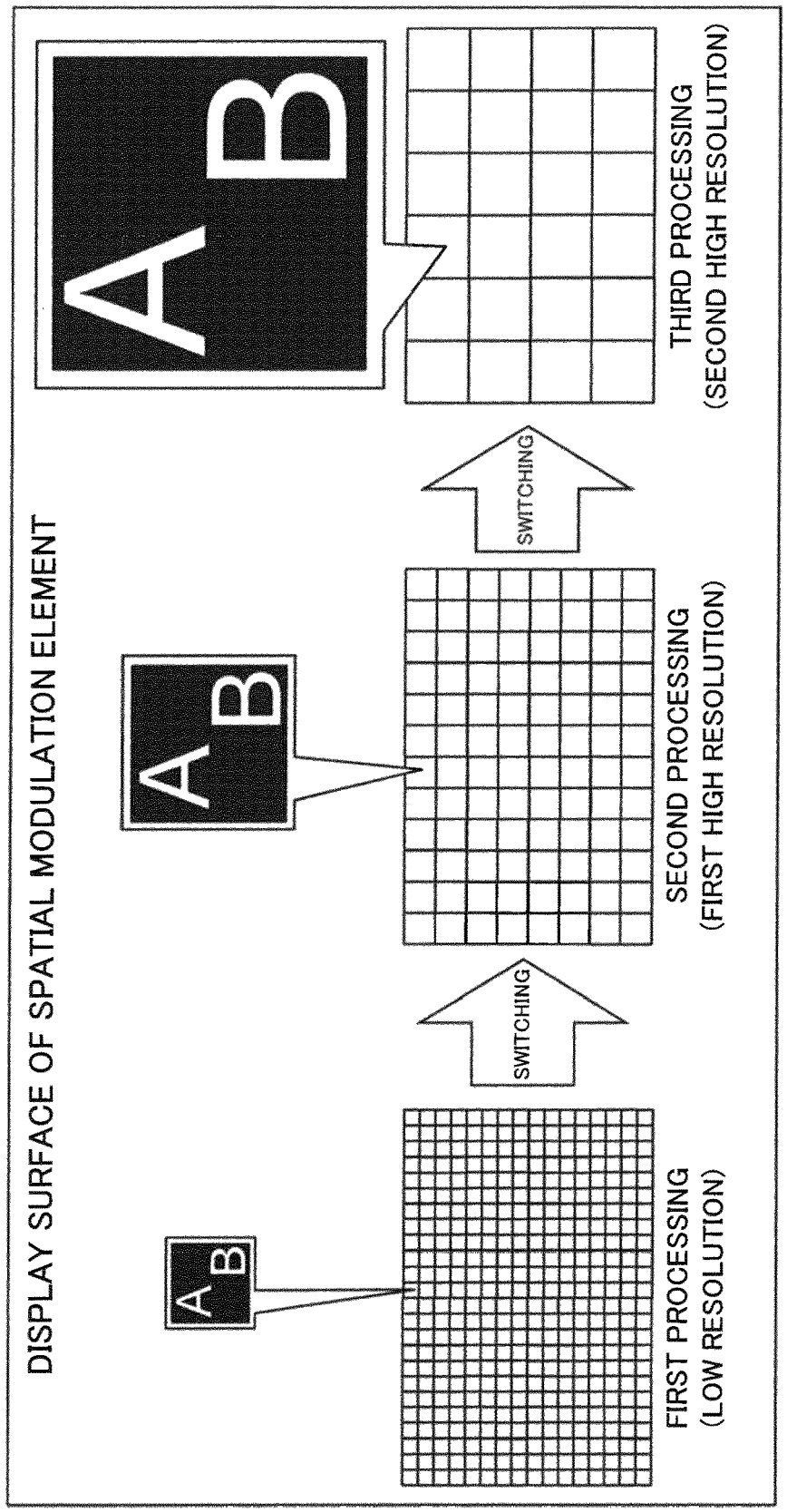
FIG. 23 is a conceptual diagram illustrating an example of dividing the display surface of the spatial modulation element in the projection device according to the fourth example embodiment of the present invention into a plurality of display areas, based on resolution.
Figure 24:
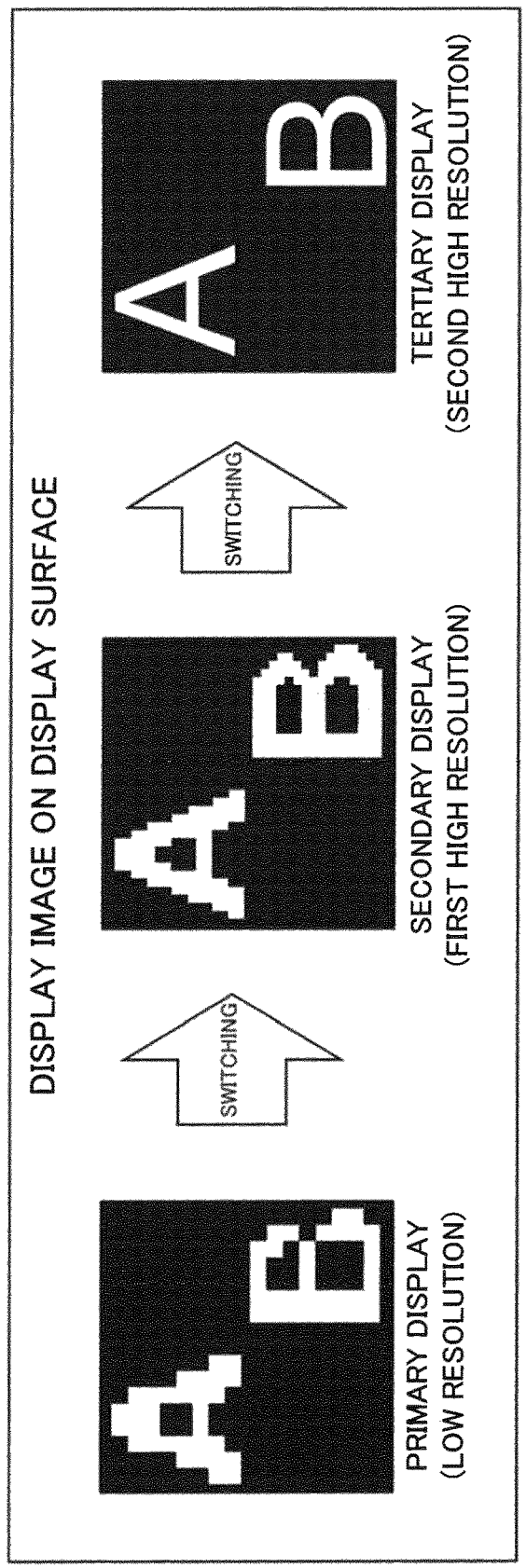
FIG. 24 is a conceptual diagram for illustrating resolution of a target image displayed by using a phase distribution displayed on each display area on the display surface of the spatial modulation element in the projection device according to the fourth example embodiment of the present invention.

FIG. 22 is a conceptual diagram for illustrating processing performed by the projection device according to the present example embodiment. FIG. 23 illustrates a state of generating phase distributions of target images with different resolutions in steps. Further, FIG. 24 illustrates a display example of target images projected by using the phase distributions generated in the respective steps.

A first processing means according to the present example embodiment performs processing of generating a phase distribution of a low-resolution target image by iterative Fourier transform processing as first processing. Further, a second processing means performs processing of generating a phase distribution of the target image with a first high resolution by iterative Fourier transform processing as second processing.

The second processing means further performs processing of generating a phase distribution of the target image with a second high resolution being a resolution higher than the first high resolution by iterative Fourier transform processing as third processing.

The example in FIG. 22 illustrates an example of the second processing means generating phase distributions of the target image with different resolutions. In this case, the second processing means may be configured with a plurality of processors. Furthermore, the third processing may be performed by a third processing means (unillustrated) different from the second processing means.

In the first processing in FIG. 23, the first processing means generates a phase distribution of the target image in 16 rows and 32 columns (low resolution). In the second processing, the second processing means generates a phase distribution of the target image in eight rows and 16 columns (first high resolution). In the third processing, the second processing means generates a phase distribution of the target image in four rows and eight columns (second high resolution). Furthermore, the first to third processing are performed in parallel.

The processing according to the present example embodiment may be configured to sequentially generate phase distributions of low-resolution and high-resolution target images by either of the first or second processing means. Further, the processing according to the present example embodiment may perform four or more types of processing in parallel instead of three types of processing.

First, in the first processing, the first processing means generates a phase distribution of a low-resolution target image related to each display area when a display surface of the spatial modulation element 13 is divided into 16 rows and 32 columns.

A phase control means 30 performs control of causing a projection means 15 to project the target image by using the phase distribution generated in the first processing. At this time, the phase control means 30 causes the display surface of the spatial modulation element 13 to be divided into display areas in 16 rows and 32 columns, and causes the phase distribution generated in the first processing to be displayed on each display area. For example, an image projected by using the phase distribution generated in the first processing is displayed as an image (primary indication) illustrated in the left-hand part of FIG. 24.

Next, in the second processing, the second processing means generates a phase distribution of a high-resolution (first high resolution) target image related to each display area when the display surface of the spatial modulation element is divided into eight rows and 16 columns.

A phase switching means 24 switches the phase distribution of the low-resolution target image generated in the first processing to the phase distribution of the target image with the first high resolution generated in the second processing.

The phase control means 30 performs control of causing the projection means 15 to project the target image by using the phase distribution generated in the second processing. At this time, the phase control means 30 causes the display surface of the spatial modulation element 13 to be divided into display areas in eight rows and 16 columns, and causes the phase distribution generated in the second processing to be displayed on each display area. For example, an image projected by using the phase distribution generated in the second processing is displayed as an image (secondary indication) illustrated in the center of FIG. 24. The target image (first high resolution) projected by using the phase distribution generated in the second processing has a higher resolution than the target image (low-resolution) projected by using the phase distribution generated in the first processing.

Next, in the third processing, the second processing means generates a phase distribution of the target image with a high resolution (second high resolution) related to each display area when the display surface of the spatial modulation element is divided into four rows and eight columns.

The phase switching means 24 switches the phase distribution of the target image with the first high resolution generated in the second processing to the phase distribution of the target image with the second high resolution generated in the third processing.

The phase control means 30 performs control of causing the projection means 15 to project the target image by using the phase distribution generated in the third processing. At this time, the phase control means 30 causes the display surface of the spatial modulation element 13 to be divided into display areas in four rows and eight columns, and causes the phase distribution generated in the third processing to be displayed on each display area. For example, an image projected by using the phase distribution generated in the third processing is displayed as an image (tertiary display) illustrated in the right-hand part of FIG. 24. The target image (second high resolution) projected by using the phase distribution generated in the third processing has a higher resolution than the target image (first high resolution) projected by using the phase distribution generated in the second processing.

(Decision Criterion)

Figure 25:
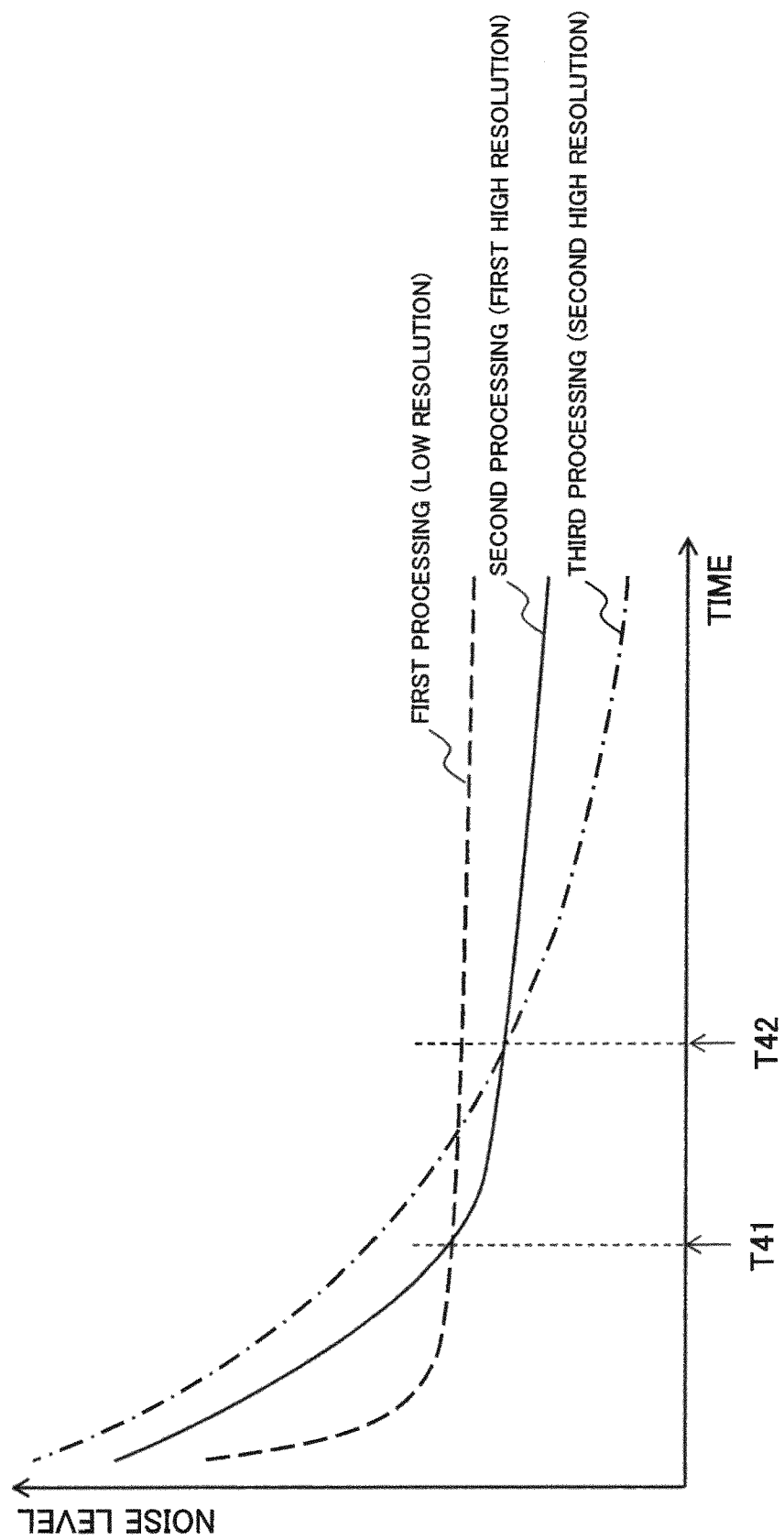
FIG. 25 is a conceptual diagram for illustrating a decision criterion in switching of a phase distribution, according to the fourth example embodiment of the present invention.

Next, a decision criterion for switching a phase distribution, according to the present example embodiment, will be described. FIG. 25 is a graph for illustrating the decision criterion according to the present example embodiment.

In the graph in FIG. 25, the horizontal axis represents a time for performing each type of processing, and the vertical axis represents a noise level when a target image is displayed by using a phase distribution generated by each type of processing. The graph in FIG. 25 illustrates variation of a noise level of the first processing with time in a broken line, variation of a noise level of the second processing with time in a solid line, and variation of a noise level of the third processing with time in a dot-and-dash line. Furthermore, while the noise level is set to the vertical axis in the example in FIG. 25, another indicator may be set to the vertical axis.

In FIG. 25, a time T41 denotes a time when a noise level of the second processing becomes equal to a noise level of the first processing. In other words, the time T41 is a criterial time at which a primary indication may be switched to a secondary indication. Further, a time T42 denotes a time when a noise level of the third processing becomes equal to a noise level of the second processing. In other words, the time T42 is a criterial time at which the secondary indication may be switched to a tertiary display. Furthermore, when actually switching the phase distributions, time points strictly equal to the times T41 and T42 do not necessarily need to be used, and times close to the times may be used.

As described above, the projection device according to the present example embodiment generates phase distributions of target images by increasing resolutions in steps, successively switches the generated phase distributions, and displays the phase distributions on the display surface of the spatial modulation element. The present example embodiment sequentially decreases a number of divisions of the display surface by increasing resolution of phase distributions displayed on the spatial modulation element in steps. Consequently, the present example embodiment is able to successively increase resolution of the desired target image.

(Fifth Example Embodiment)

Next, a projection device according to a fifth example embodiment of the present invention will be described referring to drawings. The present example embodiment differs from the fourth example embodiment in dividing a display surface of a spatial modulation element into a plurality of display areas, then grouping the display areas into at least two display area groups (hereinafter referred to as area groups), and splitting operations on phase distributions displayed on the respective area groups among different processors for each area group. Note that a configuration of the projection device according to the present example embodiment is similar to the projection device according to the second example embodiment, and therefore a drawing thereof is omitted. However, some component in the projection device according to the present example embodiment has a function partially different from the component in the projection device according to the second example embodiment.

Figure 26:
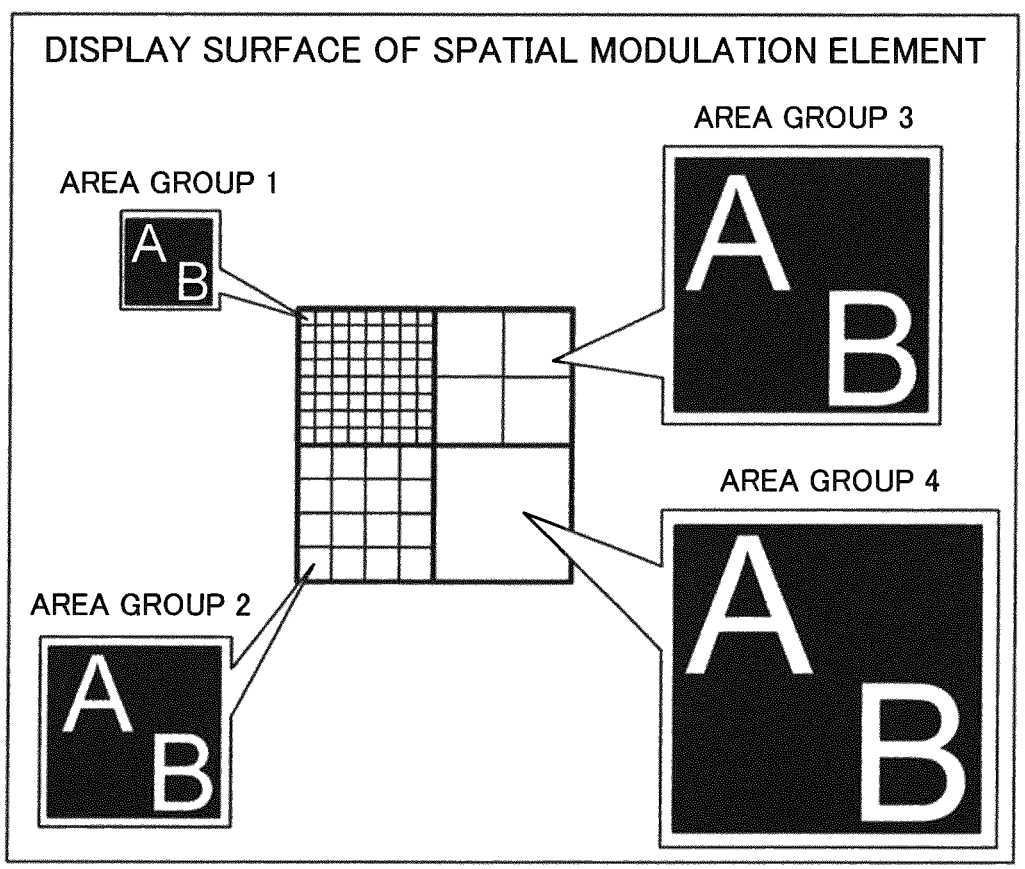
FIG. 26 is a conceptual diagram illustrating an example of simultaneously displaying phase distributions with different resolutions on a display surface of a spatial modulation element in a projection device according to a fifth example embodiment of the present invention.

FIG. 26 is an example of dividing a display surface of a spatial modulation element 13 into a plurality of display areas and grouping the display areas into several area groups. The inside of a frame in FIG. 26 is an example of dividing and grouping the display surface of the spatial modulation element 13 into four area groups being area groups 1 to 4. The respective area groups are composed of display areas respectively divided into different sizes. The area group 1 is divided into display areas in eight rows and eight columns. The area group 2 is divided into display areas in four rows and four columns. The area group 3 is divided into display areas in two rows and two columns. The area group 4 is composed of a single display area. A target image (upper left) using a phase distribution displayed on the area group 1 has the lowest resolution, and resolution increases in an order of the area group 2 (lower left), the area group 3 (upper right), and the area group 4 (lower right). Operations on phase distributions on the respective area groups are performed by different processors in parallel, according to the present example embodiment.

Figure 27:
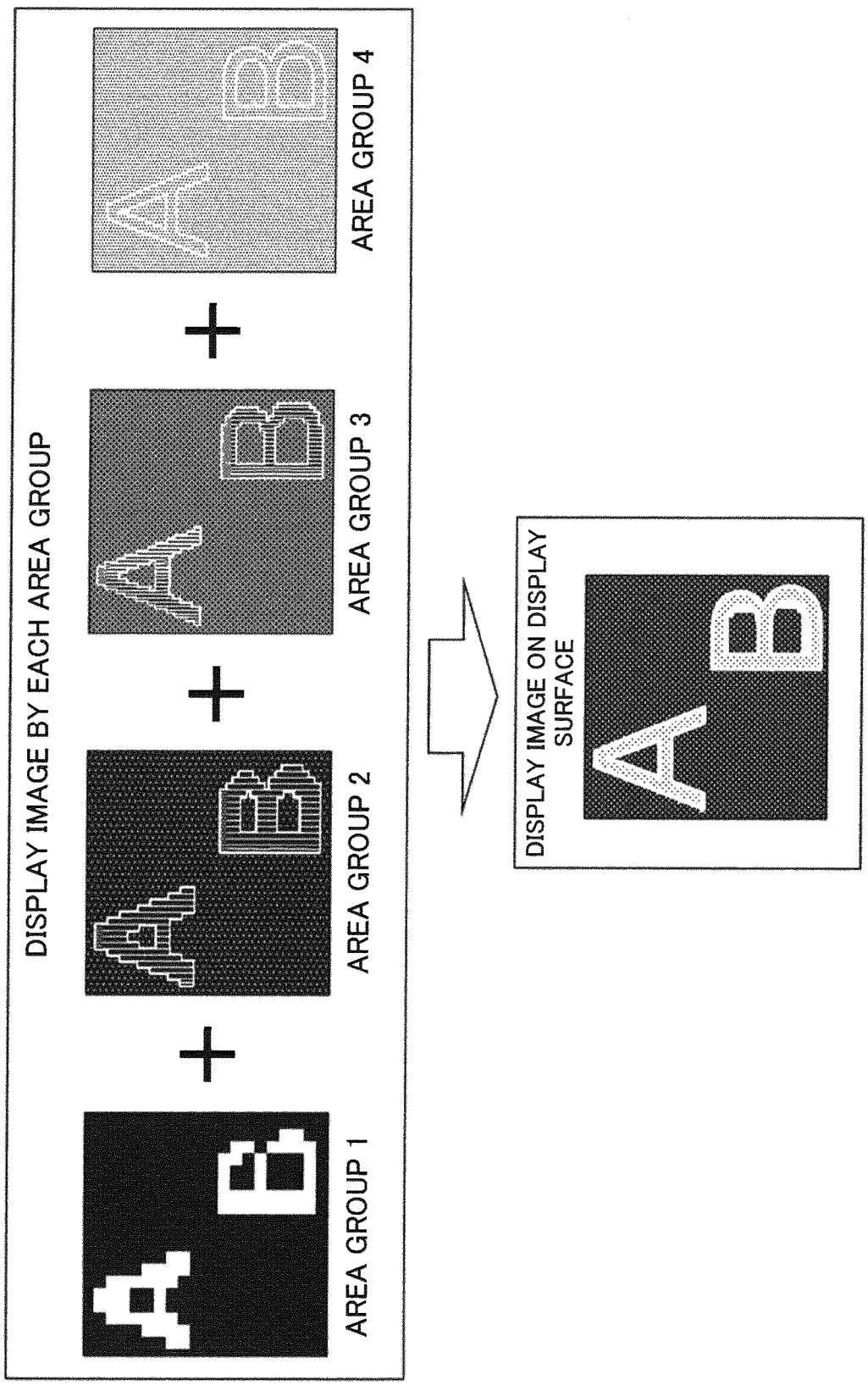
FIG. 27 is a conceptual diagram for illustrating a target image displayed by using a phase distribution displayed on the display surface of the spatial modulation element in the projection device according to the fifth example embodiment of the present invention.

FIG. 27 illustrates an example of simultaneously displaying phase distributions of target images with different resolutions on the respective area groups, according to the present example embodiment.

The upper row of FIG. 27 individually illustrates target images formed by the respective area groups. While the area group 1 with the lowest resolution provides outstanding unevenness in edges of basic patterns, the area group 1 provides fast convergence of operation, and therefore reaches a uniform light intensity distribution in a shorter period of time. On the other hand, while the area group 4 with the highest resolution provides smooth edges of the basic patterns, the area group 4 provides slow convergence of operation, and therefore it takes time to reach a uniform light intensity distribution. Accordingly, in the area group 4, a time of the central part exhibiting outstanding darkness compared with the edge is long. Furthermore, the area groups 2 and 3 exhibit intermediate states between the area groups 1 and 4.

The present example embodiment simultaneously displays phase distributions with different resolutions on the respective area groups. Consequently, as illustrated in the lower row in FIG. 27, a basic pattern having a smooth edge part and a uniform light intensity distribution is displayed from an early stage of the operation. The edge part of the basic image is smoothed by a high-resolution phase distribution. The central part of the basic image obtains a uniform light intensity distribution by a low-resolution phase distribution.

Further, the present example embodiment starts operations on phase distributions at different resolutions with respect to different area groups, successively displays phase distributions sequentially generated for the respective area groups on the display surface, and projects a target image by using the phase distributions. Then, the present example embodiment successively switches a phase distribution of a lower resolution target image to a phase distribution of a higher resolution target image, based on a decision condition, and is able to finally display a high-resolution target image.

An example of switching a phase distribution, according to the present example embodiment, will be described here.

First, when a noise level of the target image using the phase distribution of the area group 2 becomes lower than a noise level of the target image using the phase distribution of the area group 1, the number of divisions of the area displaying the area group 1 is made equal to the number of divisions of the area displaying the area group 2, and the phase distribution of the area group 2 is displayed on the area. At this stage, the phase distribution of the area group 2 is displayed on half of the area of the display surface of the spatial modulation element 13. Subsequently, when a noise level of the target image using the phase distribution of the area group 3 becomes lower than a noise level of the target image using the phase distribution of the area group 2, the number of divisions of the area displaying the area group 2 is made equal to the number of divisions of the area displaying the area group 3, and the phase distribution of the area group 3 is displayed on the area displaying the area group 2. At this stage, the phase distribution of the area group 3 is displayed on three quarters of the area of the display surface of the spatial modulation element 13. Additionally, when a noise level of the target image using the phase distribution of the area group 4 becomes lower than a noise level of the target image using the phase distribution of the area group 3, the number of divisions of the area displaying the area group 3 is made equal to the number of divisions of the area displaying the area group 4, and the phase distribution of the area group 4 is displayed on the area displaying the area group 3. At this stage, only the phase distribution of the area group 4 is displayed on the display surface of the spatial modulation element 13.

The present example embodiment is able to display a target image having a smooth edge by a high-resolution phase distribution and also a uniform light intensity distribution by a low-resolution phase distribution, by simultaneously displaying phase distributions with different resolutions on respective area groups. Additionally, the present example embodiment successively switches a lower resolution phase distribution to a higher resolution phase distribution as a noise level of the higher resolution phase distribution meets a decision criterion, and therefore a target image with a noise level similar to that according to the other example embodiments can be more rapidly displayed.

(Sixth Example Embodiment)

Next, an interface device according to a sixth example embodiment of the present invention will be described referring to drawings. The interface device according to the present example embodiment includes the projection device according to the first to fifth example embodiments.

Figure 28:
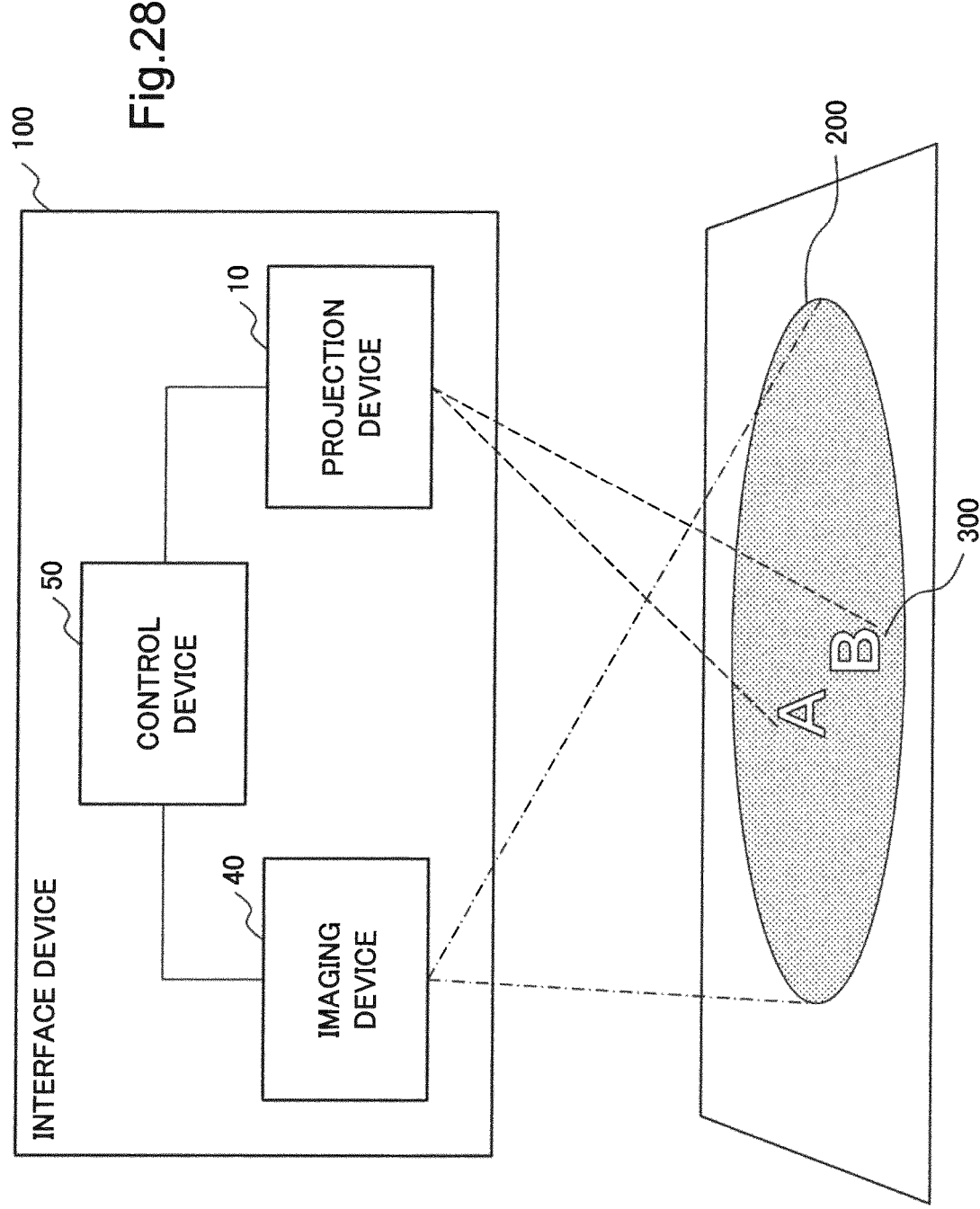
FIG. 28 is a conceptual diagram illustrating a configuration of an interface device according to a sixth example embodiment of the present invention.

FIG. 28 is a conceptual diagram illustrating a configuration of an interface device 100 according to the present example embodiment. The interface device 100 includes a projection device 10, an imaging device 40, and a control device 50. The interface device 100 captures a manipulation area 200 (predetermined manipulation area) by the imaging device 40 while projecting a user interface 300 on the manipulation area 200 by the projection device 10. By analyzing image data captured by the imaging device 40, the control means 50 recognizes a manipulation content performed on the user interface 300 displayed on the manipulation area 200. Note that the projection device 10 is the device described in the first to fifth example embodiments.

The imaging device 40 captures the manipulation area 200 displaying the user interface 300. For example, the imaging device 40 may be provided by a function of a common camera.

Figure 29:
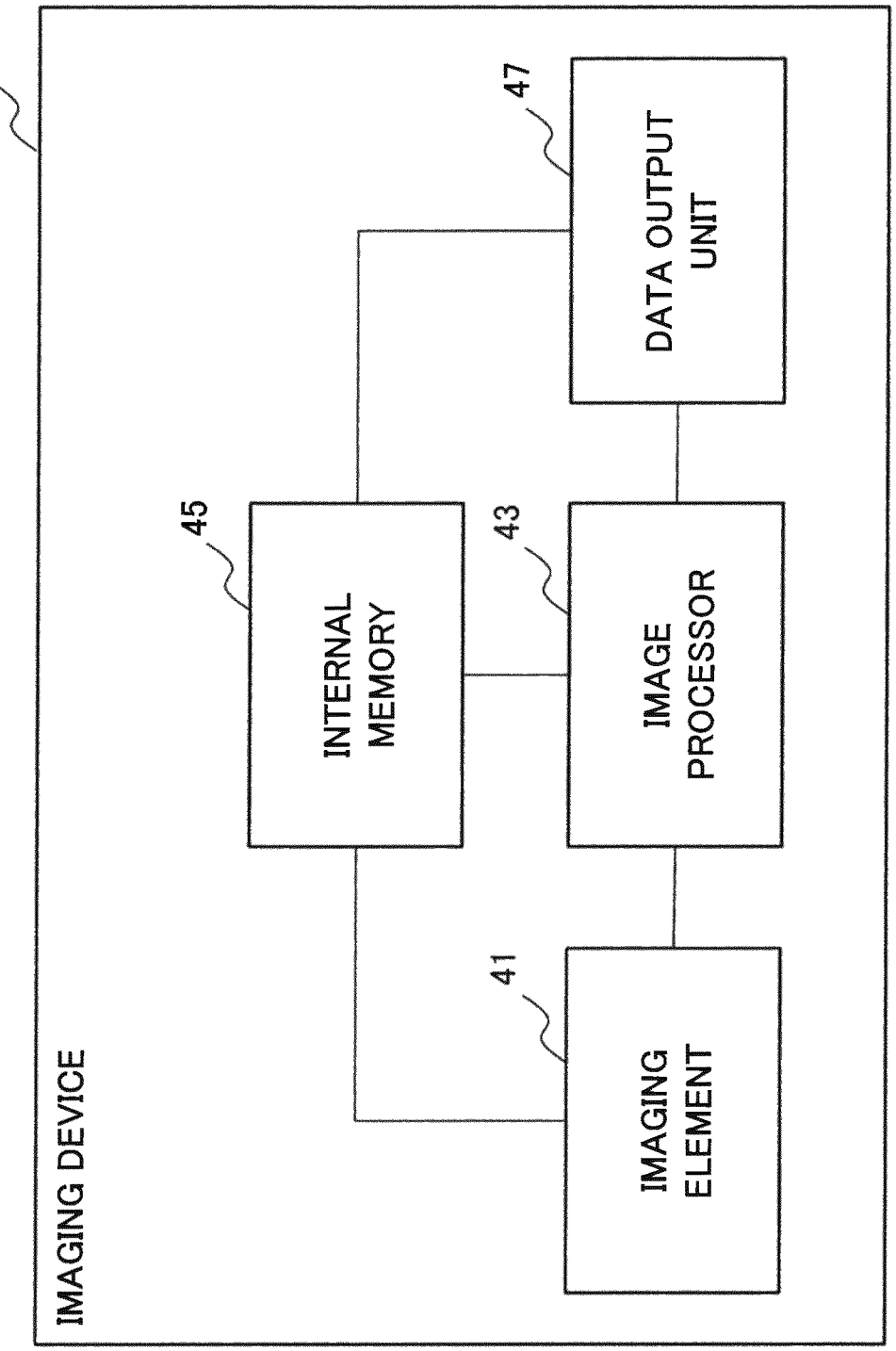
FIG. 29 is a conceptual diagram illustrating a configuration of an imaging device in the interface device according to the sixth example embodiment of the present invention.

FIG. 29 is a block diagram illustrating a configuration of the imaging device 40. As illustrated in FIG. 29, the imaging device 40 includes an imaging element 41, an image processor 43, an internal memory 45, and a data output unit 47.

The imaging element 41 is an element for capturing the manipulation area 200 and generating image data. The imaging element 41 is a photoelectric conversion element on which semiconductor parts are integrated as an integrated circuit. For example, the imaging element 41 may be provided by a solid-state imaging element such as a charge-coupled device (CCD) or a complementary metal-oxide-semiconductor (CMOS). While the imaging element 41 is normally composed of an element capturing light in the visible region, the imaging element 41 may be composed of an element capable of capturing and detecting electromagnetic waves such as infrared rays, ultraviolet rays, X-rays, gamma rays, a radio wave, and a microwave.

The image processor 43 is an integrated circuit performing image processing such as dark current correction, interpolation operation, color space conversion, gamma correction, aberration correction, noise reduction, and image compression on image information captured by the imaging element 41. Furthermore, when the image information is output without processing, the image processor 43 may be omitted.

The internal memory 45 is a storage element temporarily storing image data that cannot be processed by the image processor 43 and already-processed image data. Furthermore, the internal memory 45 may be configured to temporarily store image data captured by the imaging element 41. The internal memory 45 may be composed of a common memory.

The data output unit 47 outputs image data processed by the image processor 43 to the control device 50.

Figure 30:
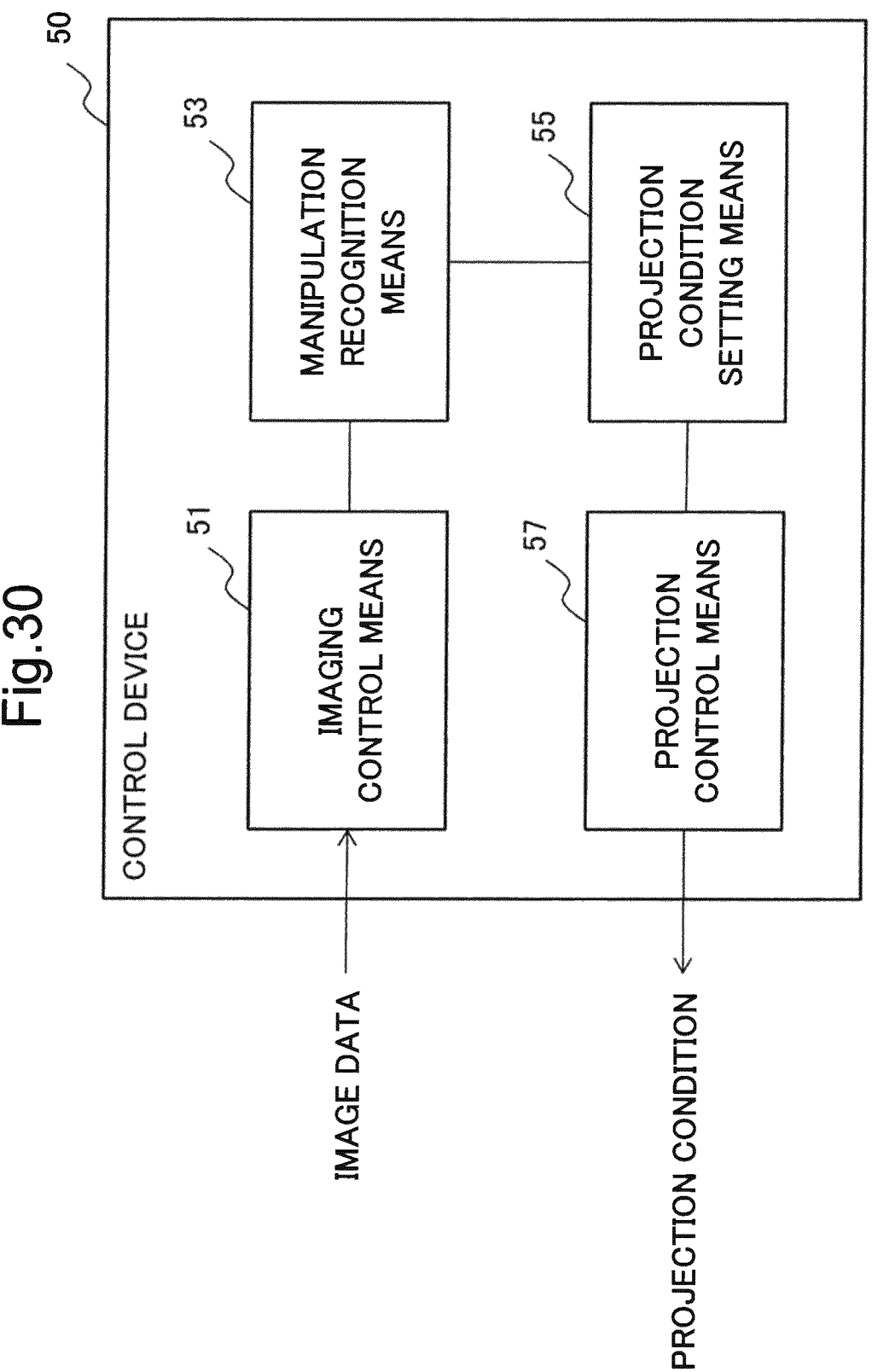
FIG. 30 is a conceptual diagram illustrating a configuration of a control device in the interface device according to the sixth example embodiment of the present invention.

FIG. 30 is a block diagram illustrating a configuration of the control device 50 according to the present example embodiment. The control device 50 includes an imaging control means 51, a manipulation recognition means 53, a projection condition setting means 55, and a projection control means 57.

The imaging control means 51 controls the imaging device 40 to capture the manipulation area 200 and acquires image data generated by the imaging device 40. The imaging control means 51 outputs the acquired image data to the manipulation recognition means 53.

The manipulation recognition means 53 acquires image data from the imaging control means 51 and, by analyzing the image data, recognizes a user manipulation content. The manipulation recognition means 53 outputs the recognized manipulation content to the projection condition setting means 55. For example, a manipulation key accepting a specific input manipulation is set on the user interface 300. The manipulation recognition means 53 may decide a manipulation position from the image data and recognize a manipulation content by associating the manipulation key on the user interface 300 with the manipulation position on the user interface 300.

The projection condition setting means 55 inputs a manipulation content recognized by the manipulation recognition means 53 and sets a projection condition, based on the input manipulation content. Note that the projection condition refers to a condition for displaying desired display information on the manipulation area 200 by the projection device 10. The projection condition setting means 55 stores target image information for each manipulation content, including the target image information in the projection condition. For example, the projection condition setting means 55 may previously store a projection condition of which target image is displayed at which location, for each manipulation content with respect to the user interface 300.

The projection condition setting means 55 transmits the set projection condition to the projection condition output unit 57.

The projection condition output unit 57 transmits a projection condition set by the projection condition setting means 55 to the projection device 10.

The projection device 10 acquires a projection condition from the control means 50 and projects the user interface 300 on the manipulation area 200, based on target image information included in the projection condition. The user interface 300 projected by the projection device 10 is displayed similarly to that by the projection devices according to the first to fifth example embodiments.

As described above, the interface device according to the present example embodiment is able to finally display a clear desired user interface while shortening a time until the user interface is displayed. Further, the projection device can be downsized, and therefore the interface device according to the present example embodiment can be configured to be wearable.

(Seventh Example Embodiment)

Next, a projection device according to a seventh example embodiment of the present invention will be described referring to drawings. The projection device according to the present example embodiment includes the projection device according to the first to fifth example embodiments. The projection device according to the present example embodiment divides and processes a component of a projected target image (hereinafter referred to as display information), based on update frequency. The projection device according to the present example embodiment is suitable for the interface device according to the sixth example embodiment. Note that a configuration of the projection device according to the present example embodiment is similar to that of the projection device according to the second example embodiment, and therefore a drawing thereof is omitted.

Figure 31:
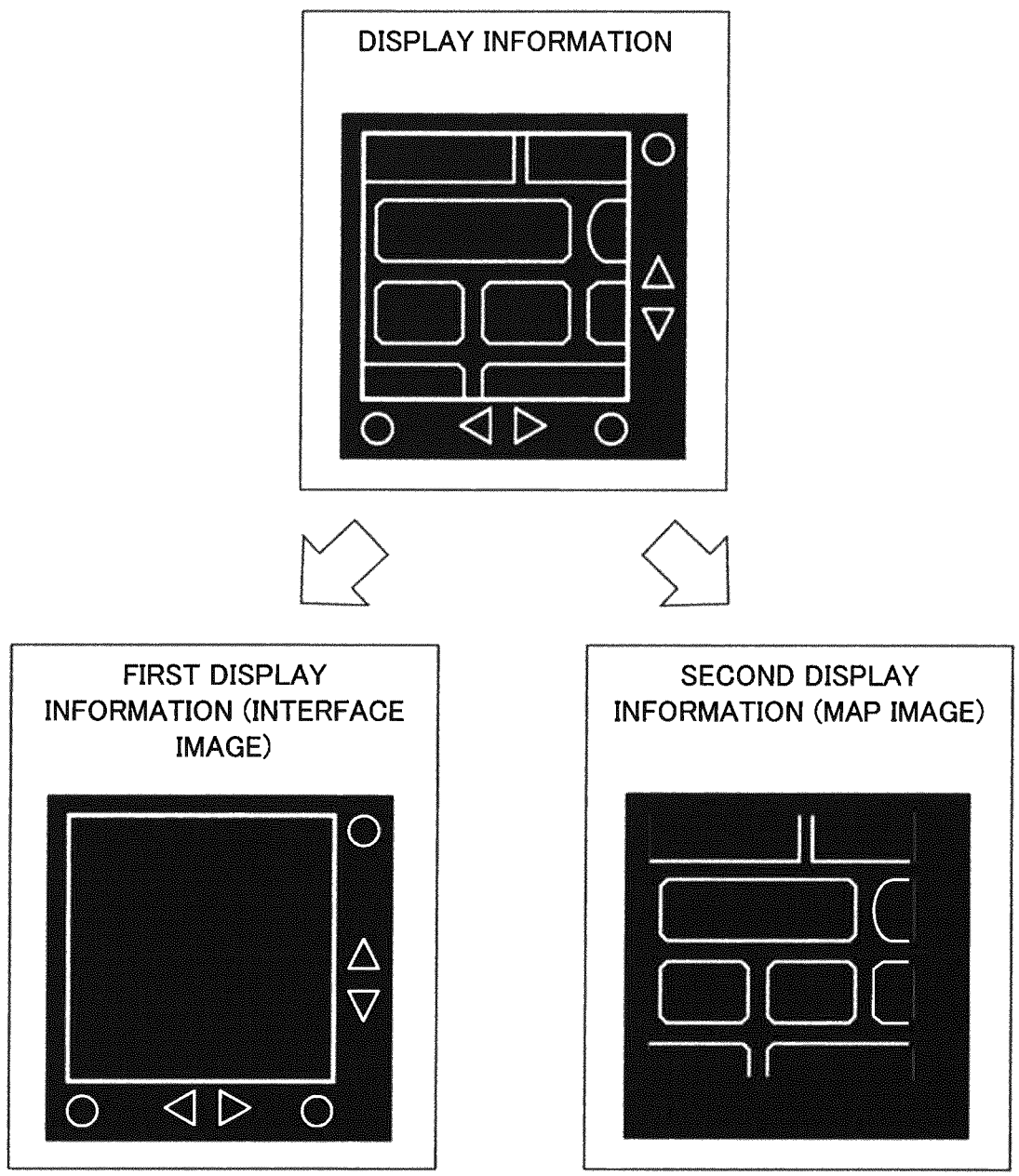
FIG. 31 is a conceptual diagram illustrating an example of dividing display information projected by a projection device according to a seventh example embodiment of the present invention, based on update frequency.

FIG. 31 is an example of the projection device according to the present example embodiment dividing projected display information into two pieces of sub-display information. It is assumed in the example in FIG. 31 that the projection device according to the present example embodiment is used in the interface device according to the sixth example embodiment. The projection device according to the present example embodiment projects display information including a user interface on a manipulation area. The user interface includes a part with a low update frequency and a part with a high update frequency.

Display information illustrated in the upper row in FIG. 31 includes a component forming an interface image (lower left) composed of a frame and a manipulation key, and a component forming a map image (lower right) combining lines. In other words, the projection device according to the present example embodiment divides and processes a component of projected display information, based on update frequency.

In the user interface projected by the interface device, update frequency of a component such as a frame or a manipulation key is low. Accordingly, the projection device may continue displaying an image including a component such as a frame or a manipulation key. On the other hand, scaling, change of a position, and the like need to be frequently performed on a map image, and therefore update frequency thereof is high. Accordingly, the projection device may sequentially display a map image similarly to the first to fifth example embodiments.

Figure 32:
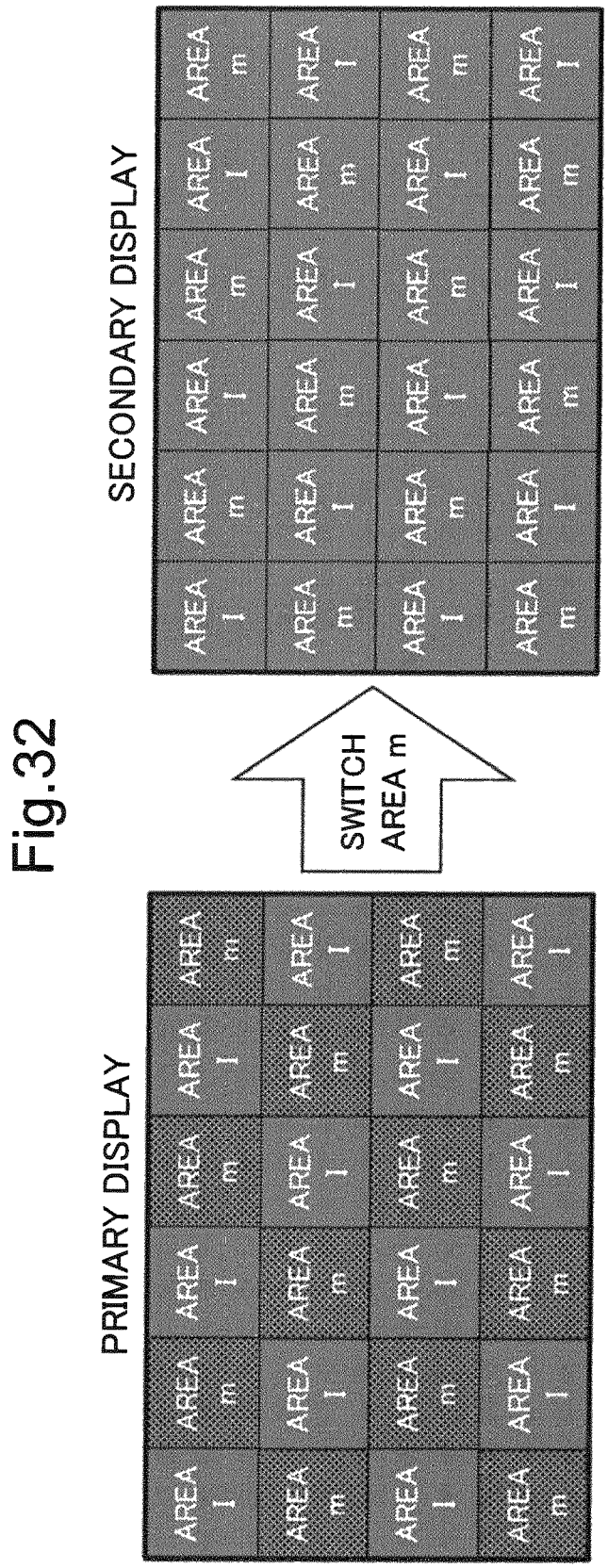
FIG. 32 is a conceptual diagram for illustrating an example of generating a phase distribution displayed on a display surface of a spatial modulation element in the projection device according to the seventh example embodiment of the present invention by different types of processing, based on update frequency.

FIG. 32 is an example of dividing a display surface of a spatial modulation element 13 into a plurality of display areas and displaying an interface image or a map image in a distributed manner on each display area. The example in FIG. 32 displays an interface image with a low update frequency on an area I and displays a map image with a high update frequency on an area m.

As a primary indication, a phase distribution of the interface image is displayed on the area I, and also a target image of the map image is displayed on the area m. In this case, similarly to FIG. 21, a phase distribution of the already-generated interface image and a phase distribution of the low-resolution map image may be simultaneously displayed on different display areas. In the primary indication, the interface image is clear, and the map image has a low resolution.

On the other hand, as a secondary indication, map images undergoing operations with resolution being increased in steps, by using the technique according to the first to fifth example embodiments, are sequentially displayed on the area m. Furthermore, with regard to the interface image displayed on the area I, the primary indication may continue to be displayed. In the secondary indication, the interface image is clear, and resolution of the map image gradually increases. Furthermore, the map image may replace the primary indication at a stage when a predetermined resolution is obtained.

As described above, a phase distribution generation means divides and processes a component of the target image, based on update frequency. With regard to a component with a high update frequency, at each update of the component, the phase distribution generation means outputs a second phase distribution generated by second processing to a phase control means after outputting a first phase distribution generated by first processing to the phase control means. With regard to a component with a low update frequency, unless the component is updated, the phase distribution generation means outputs an already-output second phase distribution to the phase control means.

Then, with regard to the component with a low update frequency, the phase control means controls the spatial modulation element to continue displaying the already-displayed phase distribution. On the other hand, with regard to the component with a high update frequency, the phase control means controls the spatial modulation element to display the second phase distribution after displaying the first phase distribution.

As described above, the projection device according to the present example embodiment displays an image being always displayed and an image being frequently updated on different display areas on the display surface of the spatial modulation element in a distributed manner. Accordingly, an operation on the image being always displayed can be omitted, and therefore a calculation cost for operation of a target image can be reduced.

(Hardware Configuration)

Figure 33:
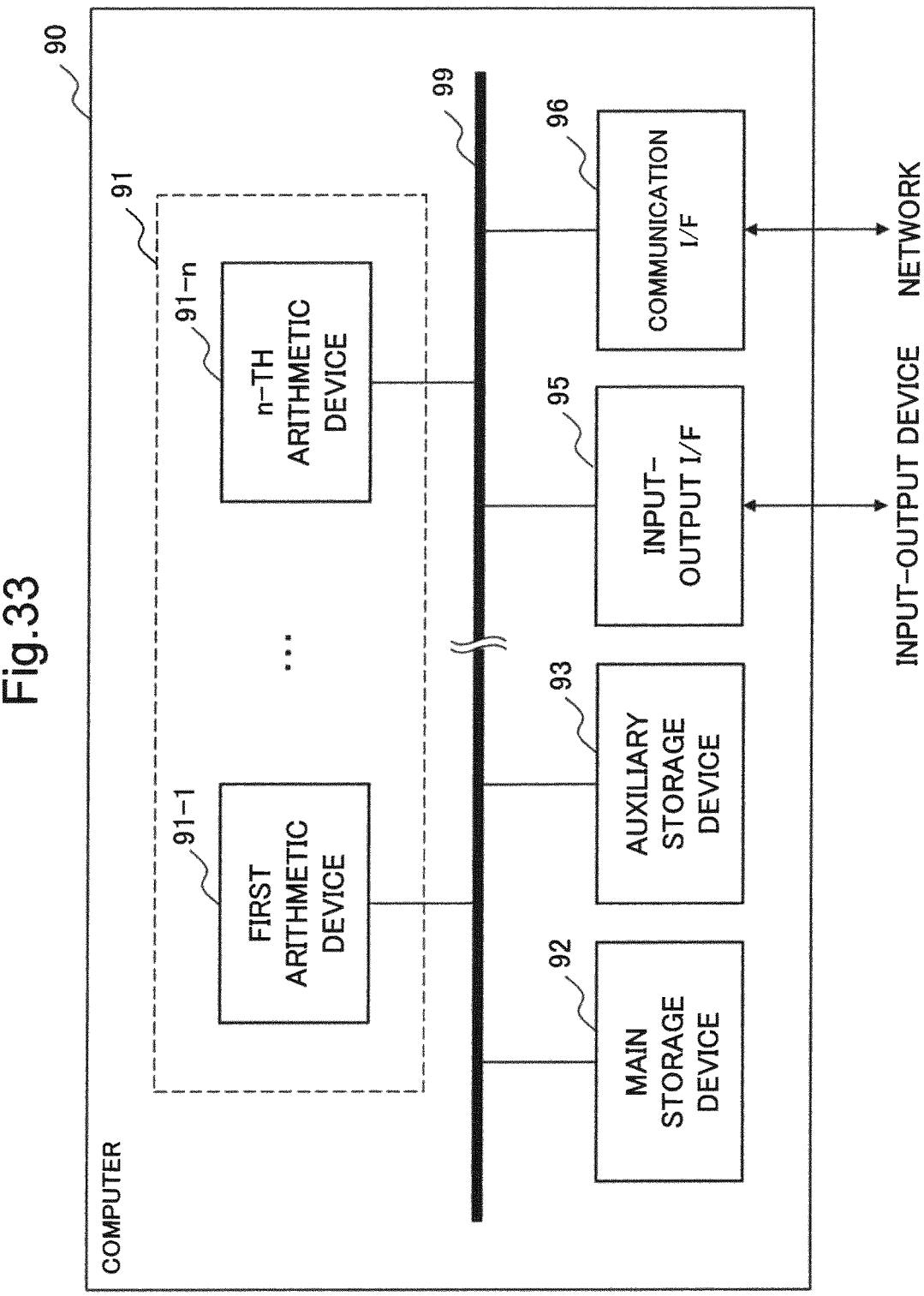
FIG. 33 is a block diagram of a hardware configuration example of a modulation element control means constituting the projection device according to the respective example embodiments of the present invention.

Next, a hardware configuration for enabling the projection device and the interface device, according to the respective example embodiments, will be described, taking a computer 90 in FIG. 33 as an example. Note that the computer 90 in FIG. 33 is a configuration example for enabling the projection device according to the respective example embodiments and does not limit the scope of the present invention. Further, when the interface device 100 according to the sixth example embodiment is configured to be wearable, it is preferable that a function of the computer 90 in FIG. 33 be provided by a microcomputer.

As illustrated in FIG. 33, the computer 90 includes a processor 91, a main storage device 92, an auxiliary storage device 93, an input-output interface 95, and a communication interface 96. The processor 91, the main storage device 92, the auxiliary storage device 93, the input-output interface 95, and the communication interface 96 are connected in a mutually data exchangeable manner through a bus 99. Further, the processor 91, the main storage device 92, the auxiliary storage device 93, and the input-output interface 95 are connected to a network such as the Internet or an intranet through the communication interface 96. The computer 90 is connected to a server and a computer in a higher level system through the network and acquires a phase distribution of a basic image and target image information from the higher level system. Furthermore, in the hardware configuration for enabling the projection device and the interface device, according to the respective example embodiments of the present invention, the processor 91 is configured to include a plurality of arithmetic devices (a first arithmetic device 91-1, . . . , an n-th arithmetic device 91-$n$) (n being a natural number greater than or equal to two).

The processor 91 loads a program stored in the auxiliary storage device 93 or the like into the main storage device 92 and executes the loaded program. The configuration according to the present example embodiment may use a software program installed on the computer 90. The processor 91 performs the arithmetic processing and the control processing in the control means according to the present example embodiment. The processor 91 is provided as a multi-core processor including the plurality of arithmetic units 91-1 to n. Each of the arithmetic units 91-1 to n may be constructed as a core operating independently.

The main storage device 92 includes an area into which a program is loaded. For example, the main storage device 92 may be a volatile memory such as a dynamic random access memory (DRAM). Further, a nonvolatile memory such as a magnetoresistive random access memory (MRAM) may be configured or added as the main storage device 92.

The auxiliary storage device 93 is a means that stores data such as a phase distribution of a basic image. The auxiliary storage device 93 includes a local disk such as a hard disk or a flash memory. Furthermore, the phase distribution of the basic image may be configured to be stored in the main storage device 92, and the auxiliary storage device 93 may be omitted.

The input-output interface 95 is a device connecting the computer 90 to peripheral equipment, in accordance with a connection standard. The communication interface 96 is an interface for connecting to the network such as the Internet or an intranet. Note that an interface is abbreviated to I/F in FIG. 33. The input-output interface 95 and the communication interface 96 may be commonalized as an interface connected to external equipment.

The computer 90 may be configured to be capable of connecting to input equipment such as a keyboard, a mouse, and a touch panel as needed. The input equipment is used for input of information and a setting. Furthermore, when a touch panel is used as the input equipment, a display screen of display equipment may be configured to also serve as an interface of the input equipment. Data exchange between the processor 91 and the input equipment may be mediated by the input interface 95.

The communication interface 96 is connected to a higher level system such as another computer or a server through the network. The higher level system transmits a phase distribution of a basic image used by the respective example embodiments to the computer 90 through the communication interface 96. Further, the higher level system transmits target image information used by the respective example embodiments to the computer 90 through the communication interface 96. The higher level system may generate the phase distribution of the basic image used by the respective example embodiments in the local system or acquire the phase distribution from another system.

Further, the computer 90 may be equipped with display equipment for displaying information. When display equipment is equipped, it is preferable that the computer 90 be provided with a display control device (unillustrated) for controlling display by the display equipment. The display equipment may be connected to the computer 90 through the input interface 95.

Further, the computer 90 may be equipped with a reader-writer as needed. The reader-writer is connected to the bus 99 and mediates, between the processor 91 and an unillustrated recording medium (program recording medium), reading of data and a program from the recording medium, writing of a processing result by the computer 90 to the recording medium, and the like. For example, the recording medium may be provided by a semiconductor recording medium such as a secure digital (SD) card or a universal serial bus (USB) memory, or the like. Further, the recording medium may be provided by a magnetic recording medium such as a flexible disk, an optical recording medium such as a compact disk (CD) or a digital versatile disc (DVD), or another type of recording medium.

The above describes an example of a hardware configuration for enabling the projection device according to the example embodiments of the present invention. Note that the hardware configuration in FIG. 33 is an example of a hardware configuration for enabling the projection device according to the present example embodiment and does not limit the scope of the present invention. Further, a processing program causing the computer to perform processing by the projection device according to the present example embodiment is also included in the scope of the present invention. Additionally, a program recording medium recording the processing program according to the example embodiments of the present invention is also included in the scope of the present invention.

While the present invention has been described above with reference to the example embodiments, the present invention is not limited to the aforementioned example embodiments. Various changes and modifications that can be understood by a person skilled in the art may be made to the configurations and details of the present invention, within the scope of the present invention.

This application is based upon and claims the benefit of priority from Japanese Patent Application No. 2015-142770, filed on Jul. 17, 2015, the disclosure of which is incorporated herein in its entirety by reference.

REFERENCE SIGNS LIST

10 Projection device
11 Light source
12 Modulation element control means
13 Spatial modulation element
15 Projection means
20 Phase distribution generation means
21 Target image reception means
22 First processing means
23 Second processing means
24 Phase distribution switching means
30 Phase control means
221 First image acquisition unit
222 Basic pattern extraction unit
223 Basic image storage unit
224 Basic image extraction unit
225 First arithmetic unit
226 First output unit
231 Second image acquisition unit
232 Second arithmetic unit
233 Second output unit

What is claimed is:

1. A projection device comprising:
   a light source;
   a spatial modulation element reflecting light from the light source by display part that displays a phase distribution of a target image;
   a modulation element control equipment that
      performs, in parallel by different processors, first processing of generating a first phase distribution of the target image and second processing of generating a second phase distribution of the same target image by processing with a calculation cost higher than that of the first processing and
      causes the first phase distribution generated by the first processing to be displayed on the display surface of the spatial modulation element and then
      switches the first phase distribution to the second phase distribution generated by the second processing to be displayed on the display surface of the spatial modulation element; and
   a projector that projects reflected light from the spatial modulation element.

2. The projection device according to claim 1, wherein the modulation element control equipment includes:
   a phase distribution generation circuit that
      performs the first processing and the second processing in parallel and,
      after outputting the first phase distribution generated by the first processing, switches the first phase distribution to the second phase distribution generated by the second processing and outputs the second phase distribution; and
   a phase control circuit that
      performs control of causing the first phase distribution output by the phase distribution generation circuit to be displayed on the display surface of the spatial modulation element as a primary indication and
      performs control of causing the second phase distribution output by the phase distribution generation circuit to be displayed on the display surface of the spatial modulation element as a secondary indication.

3. The projection device according to claim 2, wherein the phase distribution generation circuit includes:
   a target image reception circuit that receives the target image from a higher level system;
   a first processor that generates the first phase distribution by the first processing, by using the target image;

a second processor that generates the second phase distribution by the second processing, by using the target image; and a phase distribution switching circuit that outputs the first phase distribution at a stage when the first phase distribution is generated and switches the first phase distribution to the second phase distribution at a stage when the second phase distribution is generated, based on a predetermined decision criterion, and outputs the second phase distribution.

4. The projection device according to claim 3, wherein the phase distribution switching circuit uses a noise level of a target image as the predetermined decision criterion.

5. The projection device according to claim 4, wherein the phase distribution switching circuit uses a criterion that the first phase distribution is switched to the second phase distribution at or after a time point when a noise level of a target image projected by using the second phase distribution becomes lower than a noise level of a target image projected by using the first phase distribution, as the predetermined decision criterion.

6. The projection device according to claim 3, wherein the first processor includes a storage that stores a phase distribution of a basic image including a basic pattern, when acquiring the target image, extracts the basic pattern included in the target image, acquires a phase distribution of a basic image including the basic pattern from the storage, and selects a phase distribution of the acquired basic image as the first phase distribution.

7. The projection device according to claim 6, wherein the first processor composites a phase distribution of the selected basic image and outputs a composited phase distribution as the first phase distribution.

8. The projection device according to claim 6, wherein the second processor generates a phase distribution of the target image by iterative Fourier transform processing and outputs a generated phase distribution as the second phase distribution.

9. The projection device according to claim 6, wherein the modulation element control equipment divides the display surface of the spatial modulation element into a plurality of display areas and performs control of causing either the first phase distribution or the second phase distribution to be displayed on each of the plurality of display areas.

10. The projection device according to claim 9, wherein, with regard to a target image including a plurality of the basic patterns, the modulation element control equipment controls, when causing a phase distribution of the target image to be displayed on the plurality of display areas as the primary indication, the spatial modulation element to display each phase distribution of the basic image including the plurality of basic patterns on one of the plurality of display areas as the first phase distribution and controls, when causing the target image to be displayed on the plurality of display areas as the secondary indication, the spatial modulation element to switch at least one of the first phase distributions to the second phase distribution and display the second phase distribution on the plurality of display areas.

11. The projection device according to claim 9, wherein, with regard to a target image including a plurality of the basic patterns, the modulation element control equipment controls, when causing the target image to be displayed on the plurality of display areas as the primary indication, the spatial modulation element to display a composite of a phase distribution of the basic image including the basic pattern on the plurality of display areas as the first phase distribution and controls, when causing the second phase distribution to be displayed on the plurality of display areas, the spatial modulation element to switch at least one of the first phase distributions to the second phase distribution and display the second phase distribution on the plurality of display areas.

12. The projection device according to claim 6, wherein the first processor extracts a basic pattern from a new target image obtained by adding a new basic pattern to the target image being displayed, acquires a phase distribution of a basic image including the extracted basic pattern from the storage, and outputs an acquired phase distribution of the basic image along with a phase distribution of the target image being displayed as the first phase distribution.

13. The projection device according to claim 3, wherein the phase distribution generation circuit performs processing of generating a phase distribution of a low-resolution target image by iterative Fourier transform processing as the first processing and performs processing of generating a phase distribution of a high-resolution target image by iterative Fourier transform processing as the second processing, and the phase control circuit performs control of displaying, depending on resolution, a phase distribution of the target image generated by the phase distribution generation circuit on a plurality of display areas obtained by dividing the display surface of the spatial modulation element, depending on resolution.

14. The projection device according to claim 13, wherein the phase distribution generation circuit generates, in the second processing, phase distributions of the target images at a plurality of different resolutions in steps, and successively switches and outputs phase distributions of the target images with different resolutions.

15. The projection device according to claim 13, wherein the modulation element control equipment divides the display surface of the spatial modulation element into a plurality of display areas related to different resolutions, groups the plurality of display areas into an area group for each resolution, and controls the spatial modulation element to display a phase distribution of the target image with a different resolution for each of the display areas constituting the area group.

16. The projection device according to claim 15, wherein the modulation element control equipment controls the spatial modulation element to successively switch a phase distribution to be displayed on the display surface of the spatial modulation element, in accordance with the predetermined decision criterion.

17. The projection device according to claim 2, wherein the phase distribution generation circuit
- processes a component of the target image, depending on update frequency,
- with regard to a component with a higher update frequency out of components of the target image, at every update of the component with the higher update frequency, outputs the second phase distribution of the component with the higher update frequency, the second phase distribution being generated by the second processing, to the phase control circuit after outputting the first phase distribution of the component with the higher update frequency, the first phase distribution being generated by the first processing, to the phase control circuit, and,
- with regard to a component with a lower update frequency out of components of the target image, unless the component with the lower update frequency is updated, outputs a phase distribution of the already-output component with the lower update frequency to the phase control circuit, and the phase control circuit
- controls, with regard to the component with the lower update frequency, the spatial modulation element to continue displaying the already-displayed phase distribution and
- controls, with regard to the component with the higher update frequency, the spatial modulation element to display the second phase distribution after displaying the first phase distribution.

18. An interface device comprising: the projection device according to claim 1;
- a camera that generates image data by capturing a predetermined manipulation area; and
- control circuitry that controls the projection device to project a target image including a user interface on which a manipulation key accepting a specific input manipulation is arranged, on the predetermined manipulation area, and also controls the camera to capture the predetermined manipulation area, wherein the control circuitry
- recognizes a manipulation content by associating a manipulation position on the image data generated by the imaging device with the manipulation key arranged on the manipulation position and
- controls the projection device to display, on the display surface of the spatial modulation element, a phase distribution of the target image related to the manipulation content.

19. A projection method for projecting reflected light of light irradiated on a display surface of a spatial modulation element, the projection method comprising:
- performing, in parallel by different processors, first processing of generating a first phase distribution of a target image and second processing of generating a second phase distribution of the target image by processing with a calculation cost higher than that of the first processing;
- displaying the first phase distribution generated by the first processing on the display surface of the spatial modulation element; and
- switching the first phase distribution to the second phase distribution generated by the second processing to be displayed on the display surface of the spatial modulation element.

20. A non-transitory program storage medium storing a projection program for projecting reflected light of light irradiated on a display surface of a spatial modulation element, the projection program causing a computer to perform:
- processing of performing, in parallel by different processors, first processing of generating a first phase distribution of a target image and second processing of generating a second phase distribution of the target image by processing with a calculation cost higher than that of the first processing;
- processing of displaying the first phase distribution generated by the first processing on the display surface of the spatial modulation element; and
- processing of switching the first phase distribution to the second phase distribution generated by the second processing to be displayed on the display surface of the spatial modulation element.

\* \* \* \* \*